United States Patent [19]
Juhlin

[11] Patent Number: 5,158,472
[45] Date of Patent: * Oct. 27, 1992

[54] MODULAR POWERWAY FOR OFFICE FURNITURE AND THE LIKE

[75] Inventor: Gary S. Juhlin, Alto, Mich.

[73] Assignee: Steelcase Inc., Grand Rapids, Mich.

[*] Notice: The portion of the term of this patent subsequent to Mar. 3, 2009 has been disclaimed.

[21] Appl. No.: 711,363

[22] Filed: Jun. 5, 1991

Related U.S. Application Data

[63] Continuation of Ser. No. 576,798, Aug. 31, 1990, abandoned, which is a continuation-in-part of Ser. No. 377,892, Jul. 10, 1989, Pat. No. 5,092,786, which is a continuation-in-part of Ser. No. 313,726, Feb. 21, 1989, abandoned.

[51] Int. Cl.$^5$ .............................................. H01R 25/16
[52] U.S. Cl. .................................................. 439/215
[58] Field of Search ................... 174/48; 439/207–216

[56] References Cited

U.S. PATENT DOCUMENTS

| | | | |
|---|---|---|---|
| Re. 31,733 | 11/1984 | Haworth et al. | 339/4 |
| 1,958,782 | 5/1934 | Bradley | 247/3 |
| 2,042,105 | 5/1936 | Kelley | 247/3 |
| 2,064,199 | 12/1936 | Elder | 247/3 |
| 2,072,702 | 3/1937 | Beersman | 247/3 |
| 2,317,964 | 4/1943 | O'Brien | 174/101 |
| 2,441,461 | 5/1948 | Wayne | 173/334.1 |
| 2,780,788 | 2/1957 | Dyer et al. | 339/22 |
| 2,798,172 | 7/1957 | Jones | 307/147 |
| 2,952,829 | 9/1960 | Grohsgal | 339/22 |
| 3,166,370 | 1/1965 | Parker | 339/21 |
| 3,461,220 | 8/1969 | Hukin | 174/48 |
| 3,504,169 | 3/1970 | Freeburger | 240/10 |
| 3,584,213 | 6/1971 | Meltzer | 240/54 |
| 3,590,135 | 6/1971 | Herbenar | 174/49 |
| 3,619,598 | 11/1971 | Hermanson | 240/10 T |
| 3,841,042 | 10/1974 | Siegal | 52/239 |
| 3,842,320 | 10/1974 | Kiesling | 317/99 |
| 3,990,204 | 11/1976 | Haworth et al. | 52/239 |
| 4,056,297 | 11/1977 | Gartung | 339/23 |
| 4,060,294 | 11/1977 | Haworth et al. | 439/215 |
| 4,103,639 | 6/1980 | Van den Hoek et al. | 439/210 |
| 4,118,834 | 7/1979 | Boundy | 439/677 |
| 4,135,775 | 1/1979 | Driscoll | 339/22 R |
| 4,199,206 | 4/1980 | Haworth et al. | 339/4 |
| 4,231,630 | 11/1980 | Propst et al. | 339/22 |
| 4,239,932 | 12/1980 | Textoris et al. | 174/48 |
| 4,241,965 | 12/1980 | Wilson et al. | 339/4 |
| 4,270,020 | 5/1981 | Kenworthy | 174/48 |
| 4,277,123 | 7/1981 | Haworth et al. | 339/22 |
| 4,278,834 | 7/1981 | Boundy | 174/48 |
| 4,308,418 | 12/1981 | Van Kirk et al. | 439/209 |

(List continued on next page.)

FOREIGN PATENT DOCUMENTS 449739  4/1968  Switzerland.

OTHER PUBLICATIONS

Rapid Master Catalogue 439/502.

Primary Examiner—Gary F. Paumen
Attorney, Agent, or Firm—Price, Heneveld, Cooper, DeWitt & Litton

[57] ABSTRACT

A modular powerway is provided for electrifying office furniture units and the like, such as freestanding partition panels, systems furniture elements, and modular furniture units of the type having a utility raceway associated therewith. The powerway includes a housing shaped for reception within the utility raceway of the office furniture unit and electrical conductors mounted in the housing. At least one power tap or receptacle supplies electrical power from the powerway to electrical appliances, such as computers, typewriters and other similar devices. A power terminal is mounted in one end of the housing, and includes a set of quick-disconnect power connectors. A flexible flag connector has one end mounted in the opposite end of the housing, and includes a flag terminal at its free end with a set of quick-disconnect power connectors that separably mate with the quick-disconnect power connectors on the power terminal of an adjacent powerway to electrically interconnect the powerways.

18 Claims, 17 Drawing Sheets

U.S PATENT DOCUMENTS

| | | | |
|---|---|---|---|
| 4,367,370 | 1/1983 | Wilson et al. | 174/48 |
| 4,370,008 | 1/1983 | Haworth et al. | 339/4 |
| 4,376,561 | 3/1983 | Van den Hoek et al. | 439/210 |
| 4,377,724 | 3/1983 | Wilson | 174/48 |
| 4,382,648 | 5/1983 | Propst et al. | 439/209 |
| 4,429,934 | 2/1984 | Van den Hoek et al. | 439/207 |
| 4,596,098 | 6/1986 | Finkbeiner | 339/22 R |
| 4,631,881 | 12/1986 | Charman | 52/220 |
| 4,634,212 | 1/1987 | Boundy et al. | 339/198 |
| 4,666,223 | 5/1987 | Tillmann | 339/32 R |
| 4,685,255 | 8/1987 | Kelley | 52/36 |
| 4,688,869 | 8/1987 | Kelly | 439/209 |
| 4,704,691 | 11/1987 | Owens et al. | 439/491 |
| 4,713,918 | 12/1987 | Cioffi | 52/221 |
| 4,775,328 | 10/1988 | McCarthy | 439/211 |
| 4,781,609 | 11/1988 | Wilson et al. | 439/215 |

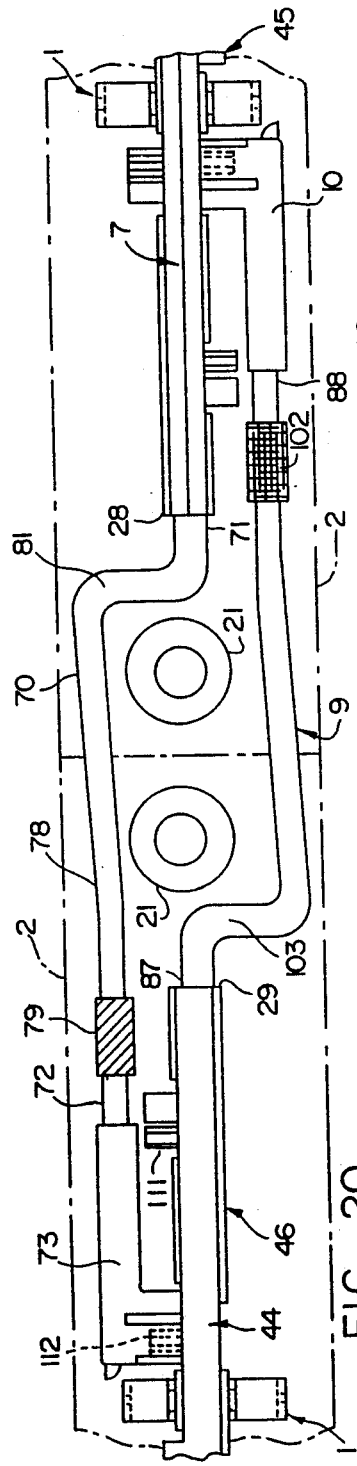
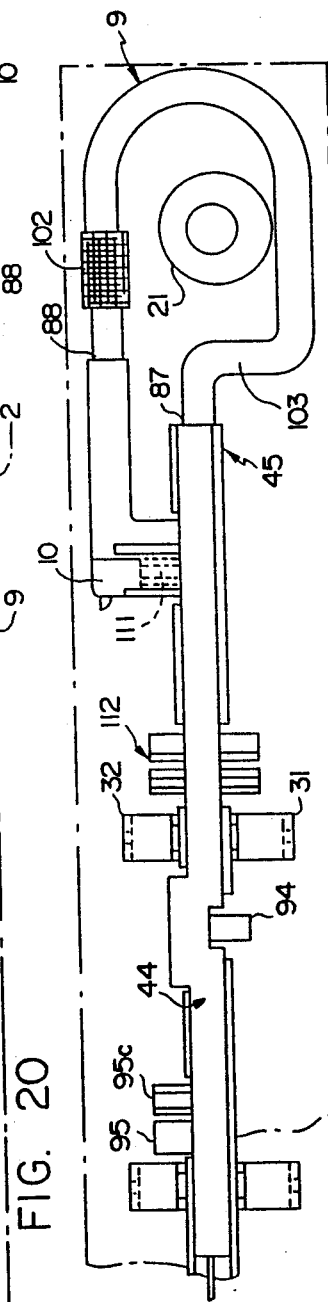
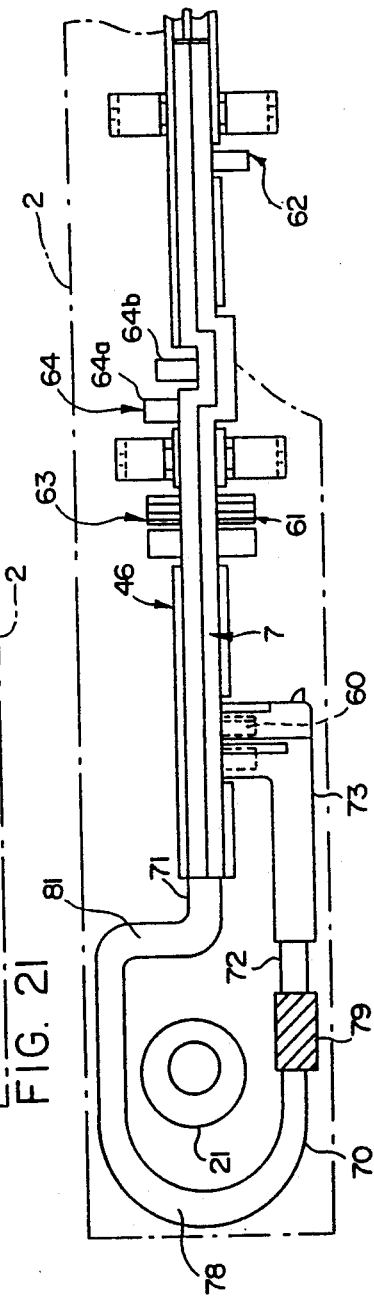

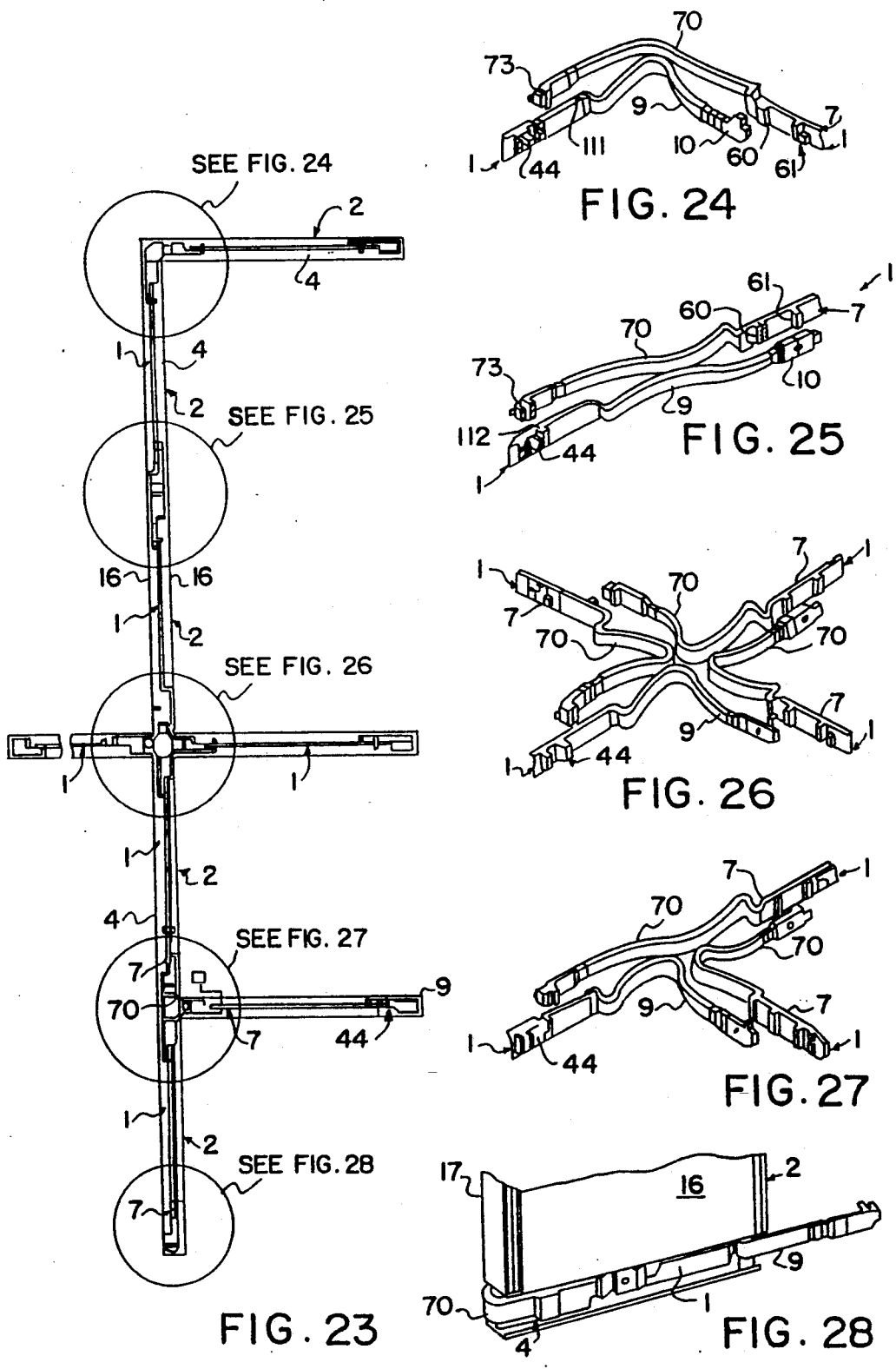

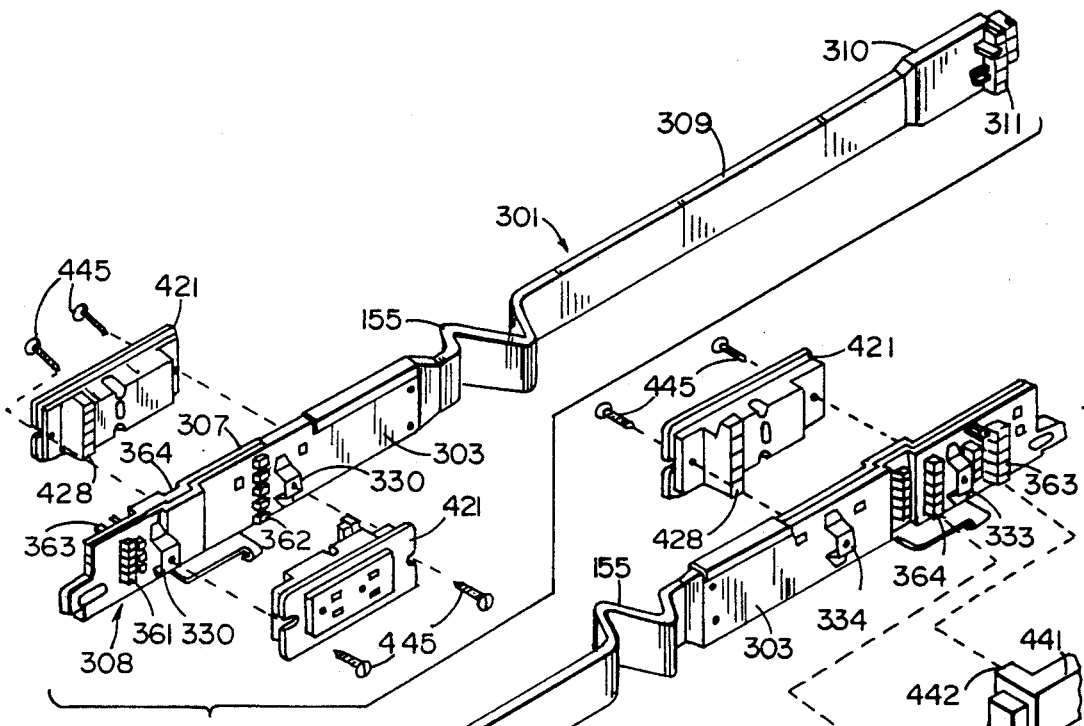
FIG. 31
FIG. 32
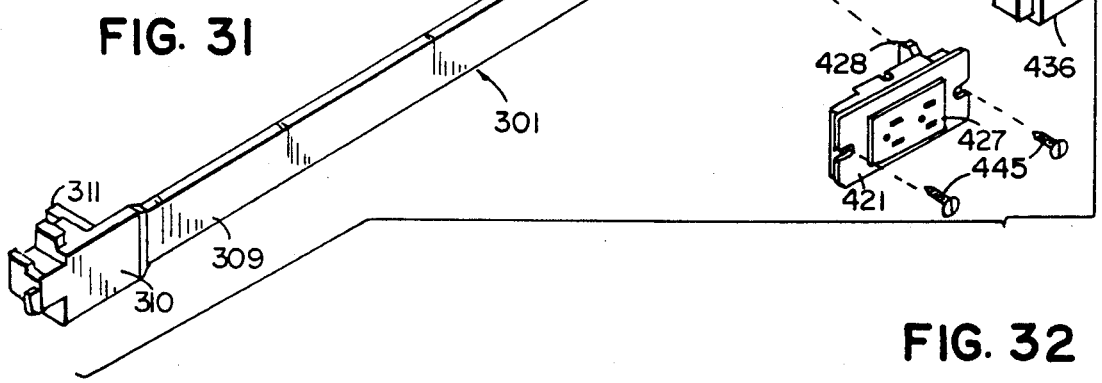
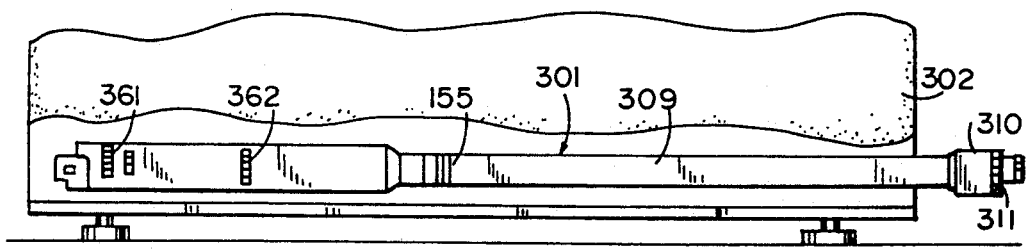
FIG. 33

MODULAR POWERWAY FOR OFFICE FURNITURE AND THE LIKE

CROSS REFERENCES TO RELATED APPLICATIONS

This is a continuation of co-pending application Ser. No. 07/576,798 field on Aug. 31, 1990, now abandoned, which is a continuation-in-part of co-pending application Ser. No. 377,892, field Jul. 10, 1989, now U.S. Pat. No. 5,092,786, which is a continuation in-part of Ser. No. 313,726 filed Feb. 21, 1989, now abandoned.

BACKGROUND OF THE INVENTION

The present invention relates to the electrification of office furniture and the like, and in particular to a modular powerway therefor.

Open office plans are well known in the art, and generally comprise large, open floor spaces that are divided off into individual offices or workstations. Several different furniture arrangements are presently available to divide up open office space, including partition panels, systems furniture, and modular furniture.

Such office furniture is preferably capable of being electrified in some fashion, so as to provide electrical power at the various workstations for computers, typewriters, dictating equipment, and other electrical appliances. To facilitate electrification, many office furniture units include a utility raceway associated therewith, in which a wiring system is housed.

Many different wiring systems for such office furniture units are currently available. Examples of some of these wiring systems are disclosed in U.S. Pat. Nos. 4,429,934; 4,060,294; 4,278,834 and 4,382,648. Office furniture wiring systems employ different techniques and arrangements to conduct electrical power through the office furniture units, and to electrically interconnect adjacent office furniture units. Convenience and versatility in both in-line and branched configurations are important design considerations, as well as electrical integrity, durability and overall safety.

Since the space inside the utility raceways is typically limited, compact wiring systems, which can fit into existing furniture units are particularly advantageous. Also, the ability to be compatible and electrically connectable with present wiring systems provides improved versatility, and greatly facilitates furniture installation and reconfiguration.

SUMMARY OF THE INVENTION

One aspect of the present invention is to provide a modular powerway arrangement for electrifying office furniture and the like, which includes a mating power terminal and flag connector system that reduces the number of separate parts and separable connectors in the powerway, so as to achieve improved electrical integrity, reliability, durability and safety. The powerway is configured so as to fit into the utility raceway of existing office furniture units, and to electrically connect with the same, thereby achieving total compatibility, and permitting retrofitting. The powerway is very versatile, adapted to electrically interconnect office furniture units in either an in-line, "L," "T," or "X" configuration. The powerway is adapted to be quickly and easily installed in the office furniture unit, is efficient in use, economical to manufacture, capable of a long operating life, and is particularly well adapted for the proposed use.

These and other advantages of the invention will be further understood and appreciated by those skilled in the art by reference to the following written specification, claims and appended drawings.

BRIEF DESCRIPTION OF THE DRAWINGS

FIG. 20 is a fragmentary, top plan view of a pair of adjacent powerways shown interconnected in an in-line relationship.

FIG. 21 is a fragmentary, top plan view of the powerway wherein a flag connector associated with the receptacle-only terminal is shown in a parked storage position.

FIG. 22 is a fragmentary, top plan view of the powerway, wherein a flag connector associated with the power terminal is shown in a parked storage condition.

FIG. 23 is a top plan schematic illustration of a series of powerways interconnected in different orientations.

FIG. 24 is a schematic perspective view of two powerways interconnected in a two-way, L-shaped junction.

FIG. 25 is a schematic perspective view of two powerways interconnected in an in-line junction.

FIG. 26 is a schematic perspective view of four powerways interconnected in a four-way, X-shaped junction.

FIG. 27 is a schematic perspective view of three powerways interconnected in a three-way, T-shaped junction.

FIG. 28 is a schematic perspective view of a powerway at a panel end of run with the power terminal flag connector shown in a storage position.

FIG. 31 is a perspective view of another powerway embodying the present invention with a single flag connector, taken from one side thereof, wherein receptacles are shown in a disassembled condition.

FIG. 32 is a perspective view of the single flag powerway illustrated in FIG. 31 taken from the opposite side thereof, with the receptacles and an electrical accessory shown in a disassembled condition.

FIG. 33 is a partially schematic front elevational view of the single flag powerway, shown installed in a panel.

DETAILED DESCRIPTION OF THE PREFERRED EMBODIMENTS

Figure 1:
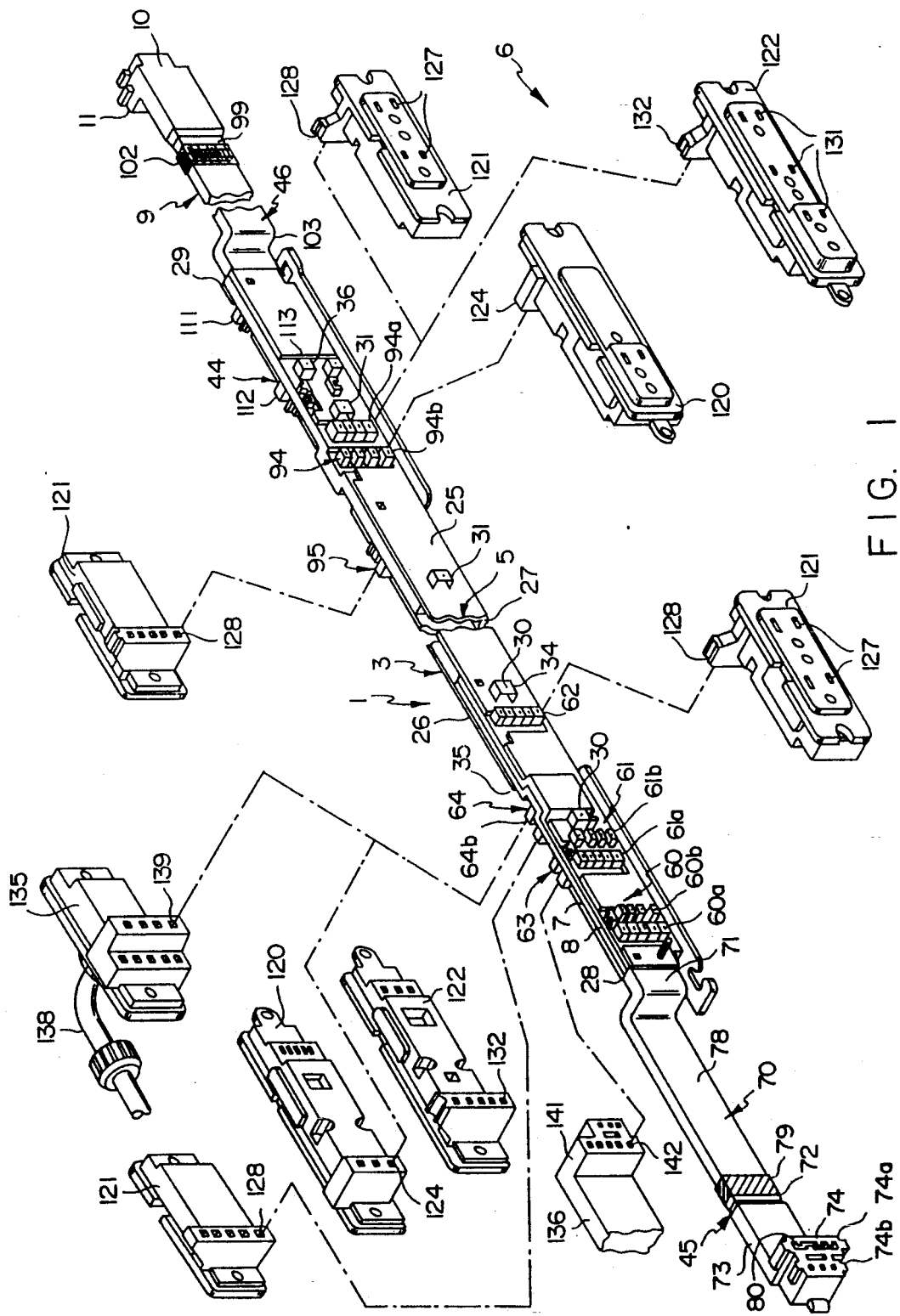
FIG. 1 is a fragmentary, perspective view of a modular powerway embodying the present invention, taken from one side thereof, and wherein various receptacles and electrical accessories are shown in a disassembled condition.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein, are not to be considered as limiting, unless the claims expressly state otherwise.

The reference numeral 1 (FIG. 1) generally designates a modular powerway embodying the present invention. Powerway 1 is adapted for use in conjunction with various types of office furniture, particularly office furniture units of the type which have a utility raceway associated therewith. Examples of such office furniture units include freestanding partition panels, wherein the utility raceway may be located at either the top or the bottom of the panel, as well as intermediate the panel. Systems furniture is also included, insofar as it is often used in conjunction with partition panel systems, and/or includes or accommodates worksurface wiring arrangements. Modular furniture, as well as any related utility ducts or tracks, such as that disclosed in Assignee's co-pending U.S. patent application Ser. No. 307,691, filed Feb. 7, 1989, entitled ELECTRICAL FLOOR TRACK are also contemplated applications of powerway 1. Hence, the term "office furniture," as used herein, includes all such office furniture arrangements, as well as their equivalents. It is to be understood that powerway 1 may also be used in conjunction with other similar settings and applications.

In the illustrated example of the present invention, powerway 1 is shown in conjunction with a partition panel 2 (FIGS. 3-7). Powerway 1 includes a housing 3 shaped to be received in the utility raceway 4 of an associated partition panel 2. The illustrated powerway 1 includes a plurality of electrical conductors 5 which are mounted in housing 3, and are electrically connected to at least one power tap or receptacle 6 (FIG. 1) from which power may be accessed to electrify office equipment, and other similar devices. A power terminal 7 is mounted in one end of the housing 3, and includes at least one set of quick-disconnect power connectors 8. A flexible flag connector 9 has one end mounted in the opposite end of housing 3, and includes a flag terminal 10 with at least one set of quick-disconnect power connectors 11 that separably mate with the quick-disconnect power connectors 8 on the power terminal 7 of an adjacent powerway 1, to electrically interconnect the powerways 1.

The illustrated partition panels 2 (FIGS. 3-7) have a conventional construction as disclosed in U.S. Pat. Nos. 4,203,639; 4,308,418; 4,376,561 and 4,429,934, which are hereby incorporated by reference. In this example, each partition panel 2 has the utility raceway 4 extending along the bottom edge of the panel 2. A pair of base trim covers 15 are provided, and detachably mount on the bottom of panel 2 to enclose the raceway 4. The illustrated base trim covers 15 include an opening 15a through which a associated one of the power taps 6 protrudes. Partition panel 2 includes opposite faces 16, with end or side trim caps 17 extending along opposite sides thereof. A base plate 18 extends along raceway 4, and has its opposite ends connected with and supported by weldments 19 and 20. A pair of adjustable feet 21 (FIG. 20) are mounted in weldments 19 and 20 (FIGS. 3-7), and serve to support partition panel 2 on a floor surface.

Powerway housing 3 (FIGS. 1 and 2) is shaped to be received within the utility raceway 4 of any of the partition panels 2, with opposite ends thereof disposed adjacent to opposite ends of raceway 4. In the illustrated example, powerway housing 3 is a rigid enclosure, having a generally linear plan configuration. Powerway housing 3 has a generally U-shaped vertical cross-sectional configuration, comprising opposite vertical flanges 25 and 26, and a central bottom web 27. Powerway housing 3 is preferably shaped to a length such that its opposite ends 28 and 29 are disposed slightly inwardly from the feet 21 of an associated partition panel 2, as shown in FIGS. 20-22. Four pairs of hat-shaped brackets 30-33 are attached to the side flanges 25 and 26 of housing 3, and include a central threaded aperture to facilitate mounting various power taps 6, and other electrical appliances thereon in a manner described in greater detail hereinafter. The flanges 25 and 26 of powerway housing 3 also include cutout areas 35 and 36 to receive electrical terminals therein, as described below. An inverted U-shaped top cap (not shown) covers the upper edges of flanges 25 and 26, and encloses housing 3.

Figure 8:
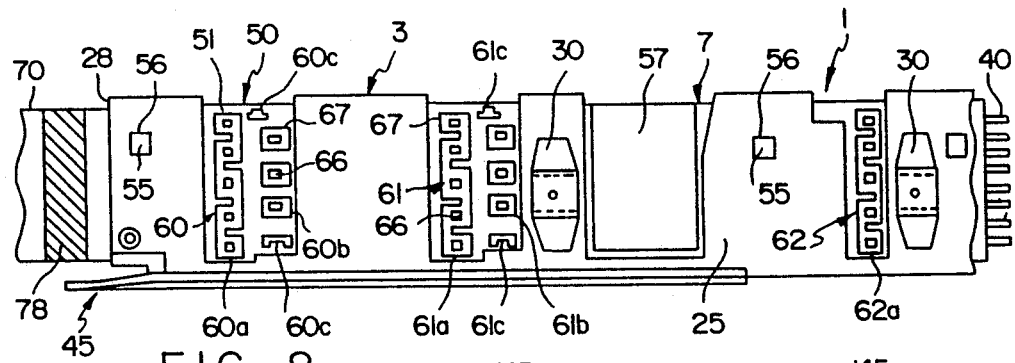
FIG. 8 is a fragmentary, side elevational view of one side of a power terminal portion of the powerway.

The powerway 1 illustrated in FIGS. 1-27 is an eight-wire system, wherein conductors 5 comprise eight separate electrical wires 40 (FIG. 8) which are mounted in housing 3. In the illustrated example, the eight-wire system has four circuits, wherein one of the circuits is isolated or dedicated, having its own hot, neutral and ground, and wherein the other three circuits have a shared neutral and a shared ground.

Each powerway 1 (FIGS. 1 and 2) includes two terminals disposed adjacent opposite ends 28 and 29 of housing 3, between which electrical conductors 40 extend. Power terminal 7 is mounted in housing cutout 35 at end 28 of powerway housing 3, and a receptacle-only terminal 44 is mounted in cutout 36 at the opposite end 29 of powerway housing 3. Electrical conductors 40 extend between power terminal 7 and receptacle-only terminal 44, and serve to electrically interconnect the same.

As described in greater detail hereinafter, the electrical interconnection of adjacent panels by attachment of flag connector 9 to the power terminal 7 of an adjacent powerway provides a directional type of interconnection, wherein the left-to-right orientation of any particular powerway 1 is relevant to the proper connection with an adjacent powerway. To facilitate proper orientation, the opposite ends of each powerway 1 are color coded, so as to provide visual indicia by which the opposite ends of the powerway can be easily identified. In the illustrated example, powerway end 45 associated with power terminal 7 is coded with the color green, whereas the opposite end 46 associated with flag connector 7 is coded yellow. For ease of description herein, reference will sometimes be made to the "green" end 45 of powerway 1, and the "yellow" end 46 of powerway 1, although it is to be understood that other colors and/or indicia can also be used for this purpose.

Figure 9:
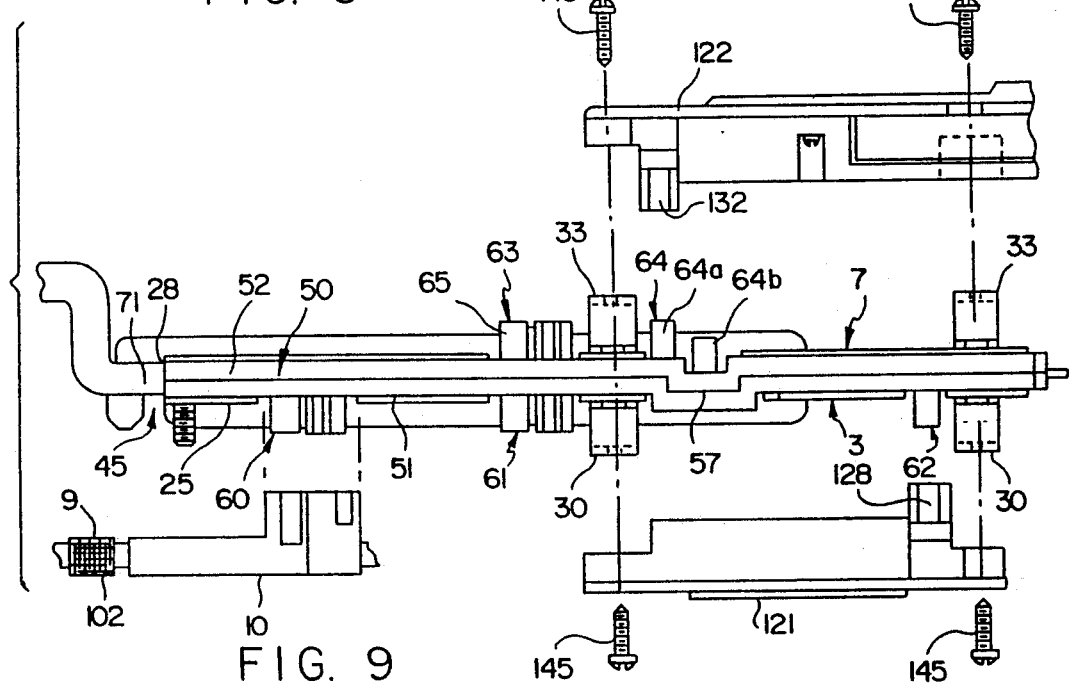
FIG. 9 is a fragmentary, top plan view of the power terminal, shown with a triplex receptacle, a duplex receptacle, and a flag connector in a disassembled condition.

Power terminal 7 (FIGS. 8-13) comprises a housing 50 mounted within the U-shaped powerway housing 3 at the green end 45 of powerway 1. Terminal housing 50 preferably has opposite halves which are also color coded in light and dark tones, so as to better visually distinguish one side of power terminal 7 from the other. For example, housing half 51 may be color coded light green, whereas housing half 52 may be color coded dark green, as best illustrated in FIG. 9. Power terminal 7 has its outermost end 53 disposed adjacent the associated green end 28 of powerway housing 3, and its inner end 54 disposed within the interior of powerway housing 3. Conductors 40 extend through mating apertures (not shown) in the inner end 54 of terminal housing 50. The illustrated power terminal 7 includes a plurality of snap-lock tabs 55 disposed on opposite sides thereof, which are received in mating windows 56 in the flanges 25 and 26 of powerway housing 3, so as to securely interconnect the same. Power terminal 7 also includes an offset medial portion 57 for purposes to be described in greater detail hereinafter.

In this example, the electrical connector 8 (FIG. 1) on power terminal 7 (FIGS. 8-13) includes five sets of quick-disconnect electrical connectors 60-64, each of which is electrically connected with at least one of the electrical conductors 40 mounted in housing 3. The construction of each of the quick-disconnect electrical connectors 60-64 is conventional, and includes a plurality of hollow male prongs 65 with a central aperture 66 in which blade-type contacts (not shown) are mounted to define electrical ports 67.

In the illustrated example, electrical connector 60 (FIGS. 8-10) protrudes laterally outwardly from the light toned side 51 of power terminal 7, and is positioned adjacent to the green end 28 of powerway housing 3. Electrical connector 60 has a total of eight ports 67, arranged in two vertical columns 60a and 60b. Port column 60a has five ports 67, whereas port column 60b has three ports 67, and is positioned interior of port column 60a. The individual ports 67 in port column 60a are interconnected to create a keyed configuration, while the individual ports 67 in port column 60a are separate. Lockout keys 60c are positioned at the upper and lower ends of conductors 60 for purposes described below. Electrical connector 60 is configured to mechanically mate with flag connector 9, and to electrically interconnect the same.

Electrical connector 61 (FIGS. 8–10) also protrudes laterally outwardly from the light toned side 51 of power terminal 7, and is spaced longitudinally a preselected distance apart from electrical connector 60. Electrical connector 61 is substantially identical in configuration to electrical connector 60, and includes a total of eight ports 67 arranged in two columns 61a and 61b, with lockout keys 60c. The individual ports 67 in port column 61a are interconnected to create a keyed configuration, while the individual ports 67 in port column 61b are separate. Electrical connector 61 is also shaped to physically mate with a flag connector 9. The longitudinal space between electrical connectors 60 and 61 is preselected so as to facilitate interconnection of adjacent powerways 1 in either a linear relationship or an angular orientation, as shown in FIGS. 23–28, and described in greater detail hereinafter.

Electrical connector 62 (FIGS. 8–10) also protrudes laterally from the light toned side 51 of power terminal 7, but has a configuration different from electrical connectors 60 and 61. Electrical connector 62 is located between hat brackets 30, immediately adjacent the innermost one of the hat bracket pair. Electrical connector 62 has a total of five ports 67, arranged in a single column 62a, and does not include any lockout keys.

Electrical connector 63 (FIGS. 11–13) protrudes laterally outwardly from the dark toned side 52 of power terminal 7, and is disposed longitudinally slightly outwardly of the outermost one of hat brackets 32. Electrical connector 63 has a total of eight ports 67, arranged in two vertical columns 63a and 63b. Column 63a includes a total of five ports 67, whereas column 63b includes a total of three ports 67, and is located longitudinally interior of port column 63a. The individual ports 67 in port column 63a are interconnected to create a keyed configuration, while the individual ports 67 in port column 63b are separate. The keyed shape of port column 63a is different from that of the port columns 60a and 61a of electrical connectors 60 and 61 respectively, so that any given electrical accessory will not connect or mate with all three electrical connectors 60, 61 and 63. Lockout keys 63c protrude from electrical connector 63 at the top and bottom of the connector.

Electrical connector 64 (FIGS. 11–13) also protrudes from the dark toned side of power terminal 7 and is positioned between hat brackets 32 adjacent the longitudinally outermost one of the hat bracket pair. Electrical connector 64 includes a total of eight ports 67, arranged in two vertical columns 64a and 64b. Port column 64a has five ports 67, whereas port column 64b has three ports 67, disposed longitudinally interior of port column 64a. The ports 67 on port column 64b are positioned in the offset portion 57 of power terminal 7, such that their outer faces are recessed behind the outer faces of the ports 67 in port column 64a for purposes to be described in greater detail hereinafter. The individual ports 6 in port column 64a are interconnected to create a keyed configuration, while the individual ports 67 in port column 64b are separate. The keyed shape of port column 64a is similar to that of the port columns 60a and 61a of electrical connectors 60 and 61, so that selected electrical accessories will connect and mate with all three electrical connectors 60, 61 and 64.

A flag connector 70 (FIGS. 1 and 2) has one end 71 fixedly mounted in the outer end 53 of power terminal 7. The outer or free end 72 of flag connector 70 includes a flag terminal 73 with a set of quick-disconnect power connectors 74 therein. Flag connector 70 is in the nature of a flexible band or festoon, and houses eight conductors (not shown) which extend through mating apertures (not shown) in the outer end 53 of power terminal 7, and electrically connect power connectors 74 with the conductors 40 in powerway housing 3. Preferably, festoon 78 has a molded construction, with a Z-shaped portion 81 adjacent inner end 71 to alleviate interference with the adjacent leg of partition panel 2.

In the illustrated example, flag terminal 73 (FIGS. 1 and 2) has a generally L-shaped plan configuration, with quick-disconnect power connectors 74 facing in the same direction as the light toned half 51 of power terminal 7. Flag connector 70 is preferably color coded similar to power terminal 7, and in the illustrated example, includes a green band 79 wrapped around a selected portion of festoon 78. The construction of quick-disconnect electrical connector 74 is conventional, and includes a plurality of female sockets or ports 80 shaped to receive a selected male port 67 therein, with blade-type contacts (not shown) mounted therein. The electrical connector 74 of flag terminal 73 has a total of eight ports 80, arranged in two vertical columns 74a and 74b. Port column 74a has five ports, whereas port column 74b includes three ports, and is disposed exterior of port column 74a. The green flag terminal 73 is keyed to mate only with either electrical connector 60 or electrical connector 61 on power terminal 7.

The double flag construction of powerway 1 provides a non-handed wiring system, wherein each powerway 1 has an identical configuration. As previously noted, powerway 1 is, however, directional, such that the color coding is provided to facilitate installation and assembly in the manner described below.

The receptacle-only terminal 44 (FIGS. 14–19) is located at the yellow end 46 of powerway 1, and comprises a terminal housing 84 received within cutout 36 of powerway housing 3. Like power terminal 7, receptacle-only terminal 4 may be constructed with two housing halves, but in the illustrated example, both halves are color coded identically. The outer end 87 of receptacle-only terminal 44 is disposed adjacent the end 29 of powerway housing 3, and the inner end 88 of receptacle-only terminal 44 is disposed within the medial portion of powerway housing 3. The inner end 88 of receptacle-only terminal 44 includes apertures (not shown) through which electrical conductors 40 extend. Receptacle-only terminal 44 includes a plurality of snap-lock tabs 89 on opposite sides thereof, which are received in mating windows 90 in housing flanges 25 and 26 to securely interconnect the same.

Receptacle-only terminal 44 (FIGS. 14–19) includes two sets of quick-disconnect electrical connectors 94 and 95, positioned on opposite sides of powerway 1. Both of the quick-disconnect electrical connectors 94 and 95 have a conventional type of construction similar to electrical connectors 60–64, having a plurality of male prongs 65 with a central aperture 66 in which blade-type contacts (not shown) are mounted to define electrical ports 67.

Electrical connector 94 protrudes laterally outwardly from receptacle-only terminal 44, and is positioned between hat brackets 31, adjacent the outermost one of the hat bracket pair. Electrical connector 94 is configured similar to electrical connector 64. Electrical connector 94 includes a total of eight ports 67, arranged in two vertical columns 94a and 94b. Port column 94a has five ports 67, whereas port column 94b has three ports 67, positioned longitudinally interior of ports 94a. Like electrical connector 64, the ports 67 on the port column 94b of connector 94 are located on an inset portion 96 of receptacle-only terminal 44, such that the outward faces thereof are recessed interior of the outer faces of the ports 67 on port column 94a. The individual ports 67 in port column 94a are interconnected to create a keyed configuration, while the individual ports 67 in port column 94b are separate. The keyed shape of port column 94a is similar to that of port columns 60a, 61a, 62a and 64a of electrical connectors 60, 61, 62 and 64 respectively, so that selected electrical accessories will connect and mate with the same. Two lockout keys 94c extend laterally outwardly of receptacle-only terminal 44 at upper and lower portions thereof.

Electrical connector 95 (FIGS. 14-19) protrudes laterally outwardly from receptacle-only terminal 44 on the side opposite electrical connector 94, and is positioned between hat brackets 32, adjacent the longitudinally innermost one of the hat bracket pair. Electrical connector 95 is shaped similar to connector 62, and includes a total of five ports 67, arranged in a single vertical column 95a. The individual ports 67 in port column 95a are interconnected to create a keyed configuration similar to port column 62a of electrical connector 62, as well as port columns 60a, 61a, 62a and 64a of electrical connectors 60, 61, 62 and 64 respectively. A lockout key 95c protrudes outwardly from receptacle-only terminal 44 adjacent the upper end of port column 95a.

Flag connector 9 is substantially identical to previously described flag connector 70, and extends longitudinally outwardly from the yellow end 46 of powerway 1. The innermost end 98 (FIGS. 14-16) of flag connector 9 is fixedly connected with the outer end 87 of receptacle-only terminal 44. The outer or free end 99 of flag connector 9 includes a flag terminal 100 in which quick-disconnect power connectors 11 are positioned. Flag terminal 10 has a substantially L-shaped plan configuration, and is oriented such that quick-disconnect power connectors 11 face in a direction opposite to the direction in which the quick-disconnect power connectors 74 on flag connector 70 face. The body of flag connector 9 is in the shape of a band or flexible festoon 101, and houses a plurality of electrical conductors (not shown), which extend through mating apertures (not shown) in the end 87 of receptacle-only terminal 44, and electrically interconnect the quick-disconnect power connectors 11 on flag terminal 10 with electrical conductors 40. Preferably, festoon 101 has a molded construction, with a Z-shaped portion 103 adjacent inner end 98 to alleviate interference with the adjacent leg of partition panel 2. Flag connector 9 is preferably color coded, and in the illustrated example, includes a yellow band 102 disposed about festoon 101.

Receptacle-only terminal 44 (FIGS. 14-19) preferably includes at least one parking member 110 adapted to separably receive and retain thereon one of the flag terminals 73 or 10, so as to retain the associated flag connector 9 or 70 in a storage position. In the illustrated example, receptacle-only terminal 44 includes three parking members, in the form of studs or post pairs 111-113. Each post pair 111-113 includes two square-shaped ports 67 substantially identical to the upper and lowermost ports of any one of the connector columns 60a-64a and 94a-95a. Post pairs 111 and 112 are disposed on the same side of receptacle-only terminal 44, positioned longitudinally outwardly of the hat brackets 32. Post pairs 111 and 112 are spaced longitudinally apart a preselected distance, which enables the same to attach to flag terminals 73 and 10 for storage when adjacent powerway 1 is arranged in either an in-line or an angular orientation, as described in greater detail below. Post pair 113 is located opposite post pair 112, and is auxiliary with respect to the present system. Each post pair 111-113 includes lockout keys 111a-113a respectively to limit the type of accessory that can be mounted thereon to flag terminals 73 and 10.

Figure 2:
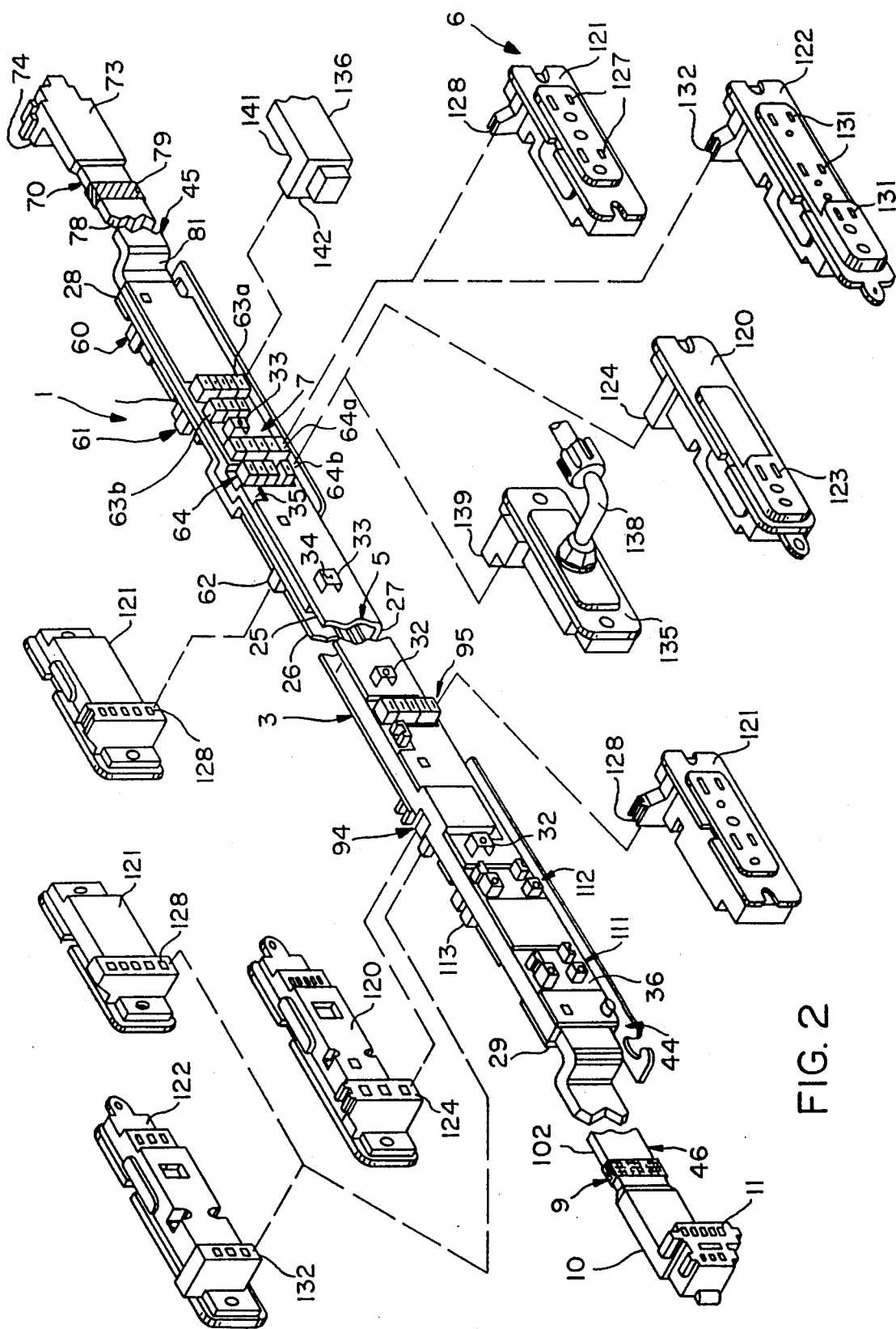
FIG. 2 is a fragmentary, perspective view of the powerway, taken from the opposite side thereof, and with the receptacles and accessories shown in a disassembled condition.
Figure 3:
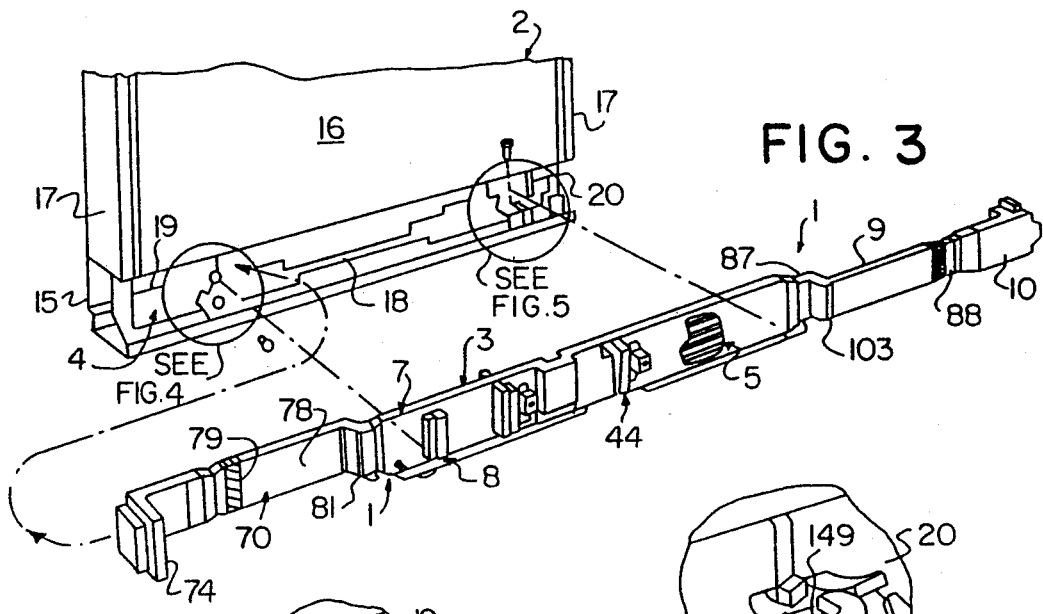
FIG. 3 is a perspective view of the powerway and an associated partition panel shown in a disassembled condition.
Figure 4:
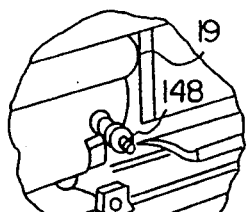
FIG. 4 is an enlarged perspective view of a fastener mounting one end of the powerway in the partition panel.
Figure 5:
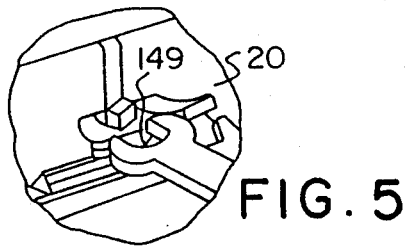
FIG. 5 is an enlarged perspective view of a fastener mounting the opposite end of the powerway in the partition panel.
Figure 6:
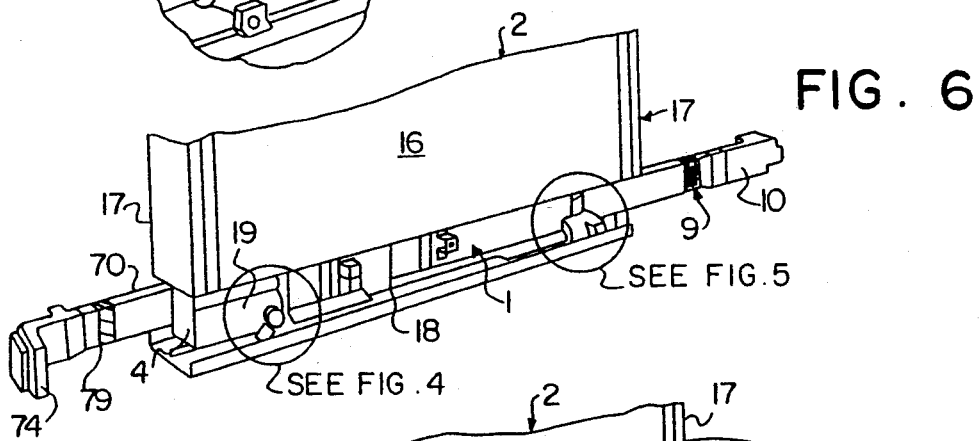
FIG. 6 is a perspective view of the powerway and the partition panel shown in an assembled condition.
Figure 7:
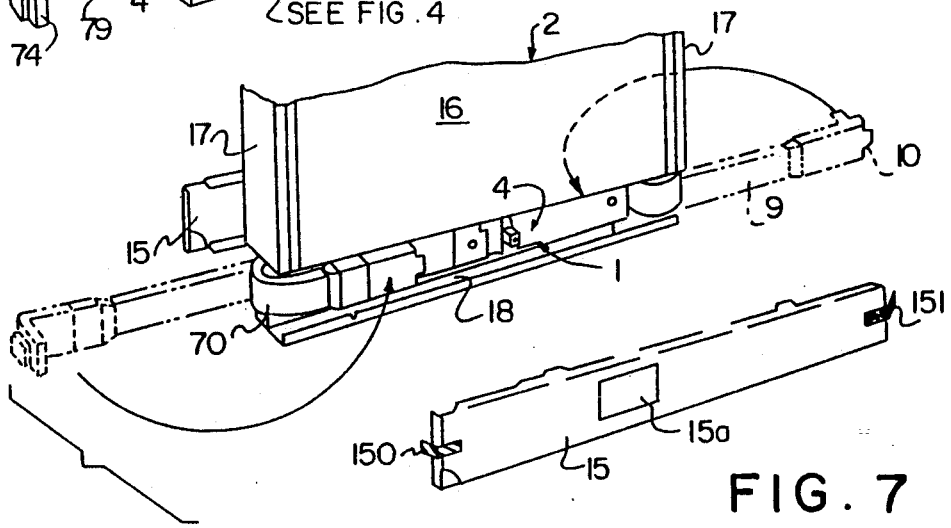
FIG. 7 is a perspective view of the powerway and partition panel in the assembled condition and wherein opposite flag connector portions of the powerway are shown in a folded storage position with opposite base cover panels exploded away.

With reference to FIGS. 1 and 2, powerway 1 is adapted for use in conjunction with a number of different electrical accessories, which are physically mounted thereon by fasteners at hat brackets 30-33. In the illustrated example, three different types of power taps or receptacles are illustrated, including a simplex receptacle 120, a duplex receptacle 121 and a triplex receptacle 122.

Simplex receptacle 120 includes a single conventional plug socket 123 on the forward side thereof, and is designed to electrically access the isolated or dedicated circuit of eight-wire powerway 1. Simplex receptacle 120 includes a set of sockets or ports 124 on the rear side thereof, which are adapted to mate only with the connector ports 94b of receptacle-only terminal 44 and the connector ports 64b of power terminal 7.

Duplex receptacle 121 (FIGS. 1 and 2) includes two conventional plug sockets 127 on the forward side thereof, and is designed to electrically access one of the common circuits. Duplex receptacle 121 includes a set of power sockets or ports 128 on the rear side thereof, which are adapted to mate only with ports 94a of receptacle-only terminal 44, ports 95a of receptacle-only terminal 44, or ports 62a of power terminal 7.

Triplex receptacle 122 has three sets of conventional plug sockets 131 on the forward side thereof, and is designed to electrically access one of the common circuits. Triplex receptacle 122 includes a set of power sockets or ports 132 on the rearward side thereof, which are shaped to mate only with the ports 94a of receptacle-only terminal 44, or the ports 64a of power terminal 7. The various keys 60c-64c and 94c-95c prevent receptacles 120-122 from being attached to powerway 1 in a manner other than that described above.

In addition to receptacles 120-122, powerway 1 (FIGS. 1 and 2) is also adapted to be used in conjunction with a base power-in module 135 and an accessory flag connector 136, the latter of which may be used for lighting harnesses, power poles, top power-in, or the like (not shown).

Base power-in module 135 (FIGS. 1 and 2) has a conduit 138 attached fixedly to the exterior side thereof for connection with building power, such as a tombstone or the like. Base power-in module 135 is designed to access all of the circuits and conductors 40 of powerway 1 to supply electrical power thereto. A set of eight sockets 139 are located on the rear side of base power-in module 135, which mate only with ports 64a and 64b on power terminal 7. The keys 94c on receptacle-only terminal 44 prevent base power-in module 135 from being electrically connected with receptacle-only terminal 44.

As best illustrated in FIGS. 9-10, 12-13, 15-16 and 18-19, the offset areas 57 and 96 of power terminal 7 and receptacle-only terminal 44 respectively permit attachment of either one of the receptacles 120-122 or a power-in module 135 to the eight port electrical connectors 64 and 94, without substantially increasing the width of the associated partition panel 2.

Accessory flag connector 136 (FIGS. 1 and 2) includes an L-shaped terminal 141 with a set of quick-disconnect power connectors 142 electrically connected with accessory conductors (not shown). Accessory flag terminal 141 has a substantially L-shaped plan configuration, and connectors 142 are in the form of a socket keyed to mate only with connectors 63a and 63b of power terminal 7. The shape of ports 142 precludes attachment of accessory flag terminal 141 with any of the other connectors on powerway 1.

Each of the receptacles 120–122 and power accessories 135–136 is securely fastened to powerway 1 at their selected location. In this example, receptacles 120–122 and power accessories 135–136 are fastened to one of the pairs of hat brackets 30–33 by a pair of threaded screws 145.

In operation, a powerway 1 is physically mounted in each of the partition panels 2 which is to electrified in the manner illustrated in FIGS. 3–7. A spin nut 148 (FIG. 4) fastens one end of powerway 1 to panel weldment 19, and a conventional nut 149 (FIG. 5) fastens the opposite end of powerway 1 to panel weldment 20. When powerways 1 are factory installed in panels 2, flag connectors 9 and 70 are folded over the associated feet 21 of the panel 2, with the associated terminal snapped into place. More specifically, the green end flag terminal 73 (FIG. 22) is attached to either electrical connector 60 or 61 of power terminal 7, as shown in FIG. 22, and the yellow end flag terminal 10 is attached to either parking posts 111 or 112, as illustrated in FIG. 21. Base panel covers 15 (FIG. 7) are also provided with color coded tape strips 150 and 151 so that after the covers 15 are attached to the panel 2, the orientation of powerway 1 within panel 2 can be easily visually ascertained.

Figure 10:
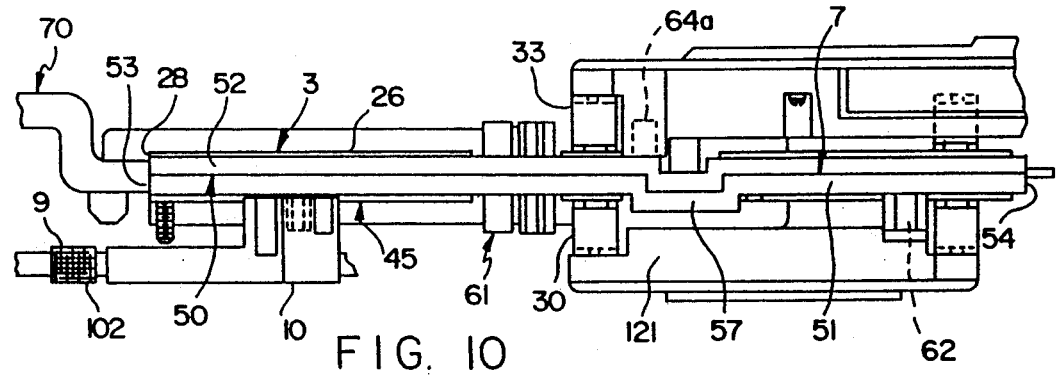
FIG. 10 is a fragmentary, top plan view of the power terminal shown in FIG. 9, wherein the triplex receptacle, the duplex receptacle, and the flag connector are shown in an assembled condition.
Figure 11:
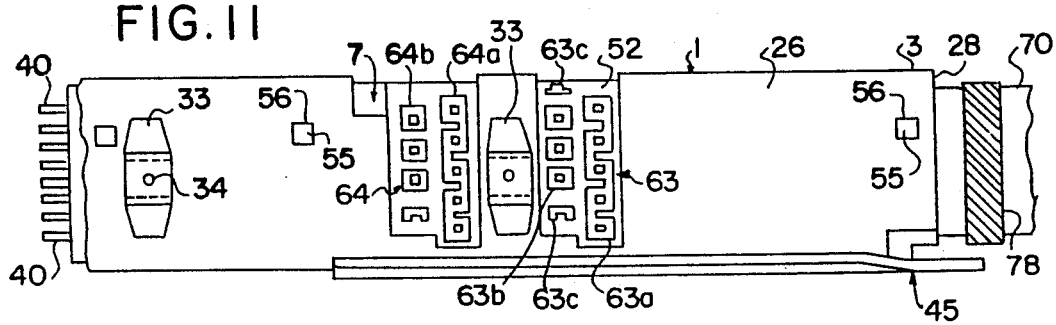
FIG. 11 is a fragmentary, side elevational view of the opposite side of the power terminal.
Figure 12:
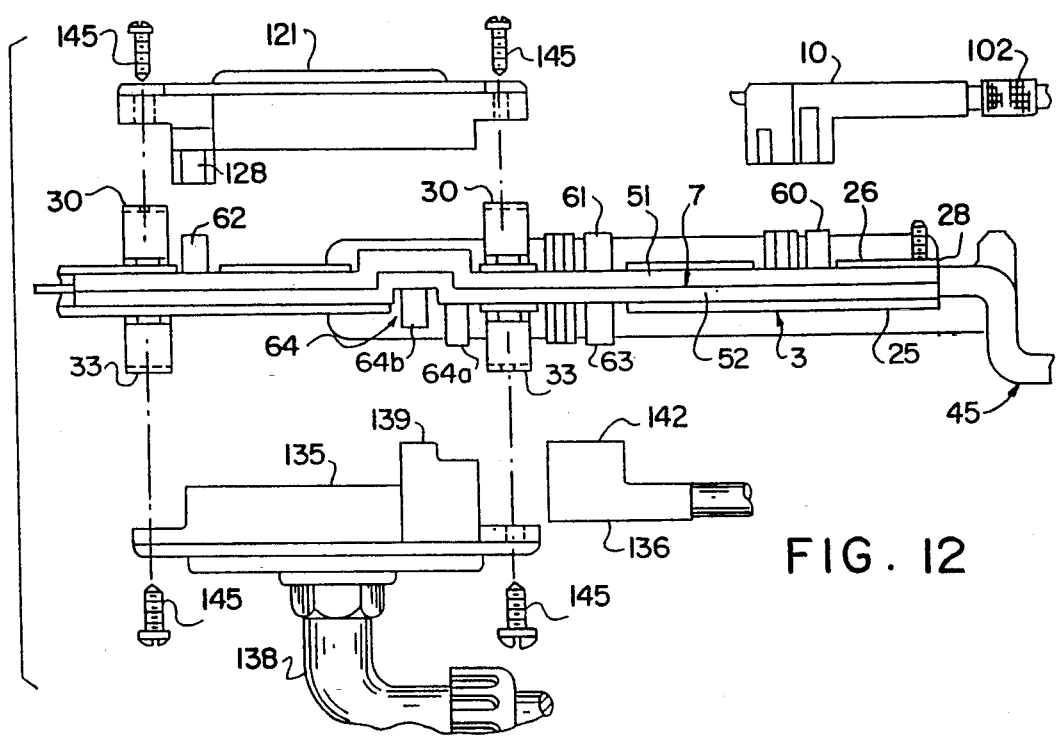
FIG. 12 is a fragmentary, top plan view of the power terminal, shown with a duplex receptacle, a power-in module, and a flag connector in a disassembled condition.
Figure 13:
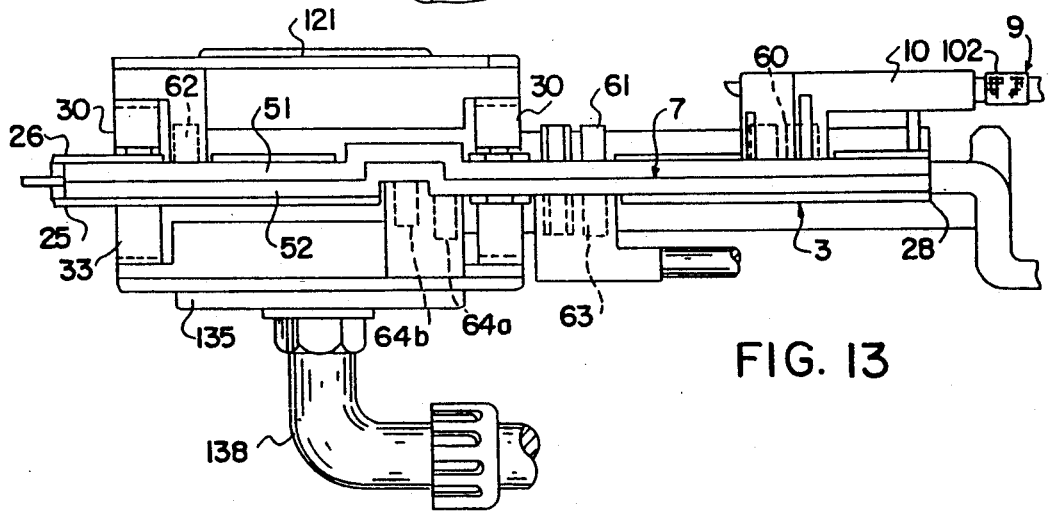
FIG. 13 is a fragmentary, top plan view of the power terminal shown in FIG. 12, wherein the duplex receptacle, the power-in module, and the flag connector are shown in an assembled condition.
Figure 14:
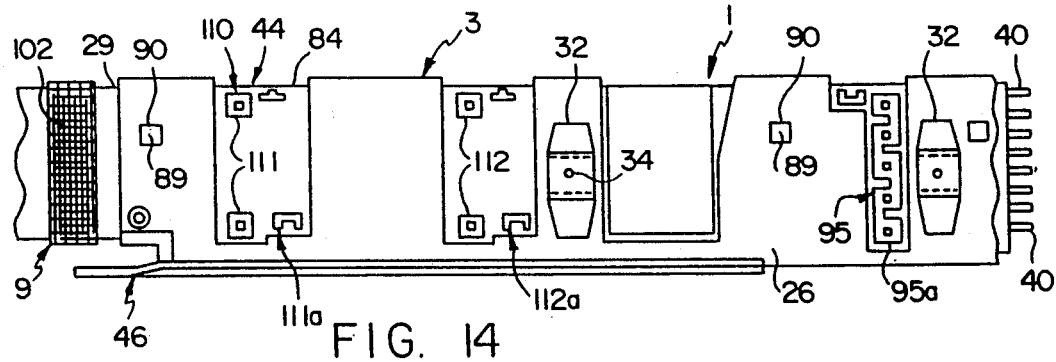
FIG. 14 is a fragmentary, side elevational view of one side of a receptacle-only terminal.
Figure 15:
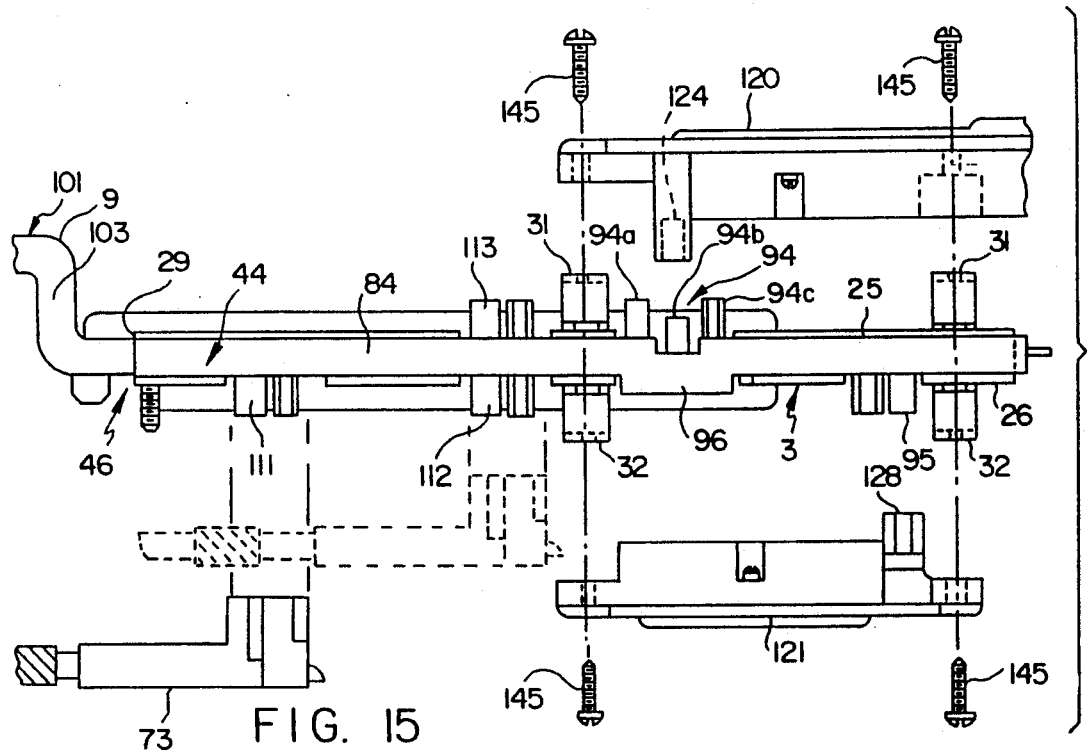
FIG. 15 is a top plan view of the receptacle-only terminal, wherein a simplex receptacle, a duplex receptacle, and a flag connector are shown in a disassembled condition.
Figure 16:
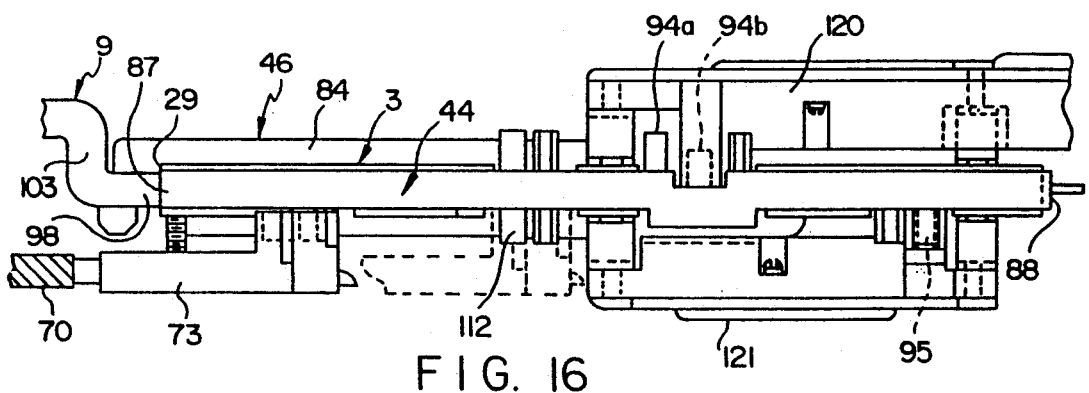
FIG. 16 is a fragmentary, top plan view of the receptacle-only terminal shown in FIG. 15, wherein the simplex receptacle, the duplex receptacle, and the flag connector are shown in an assembled condition.
Figure 17:
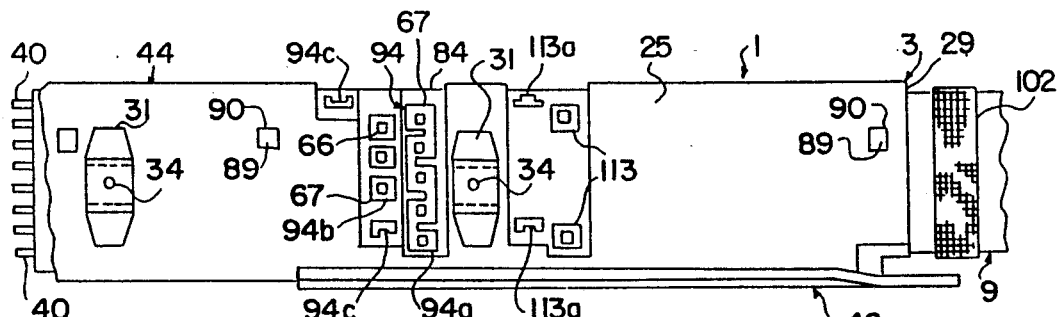
FIG. 17 is a fragmentary, side elevational view of the opposite side of the receptacle-only terminal.
Figure 18:
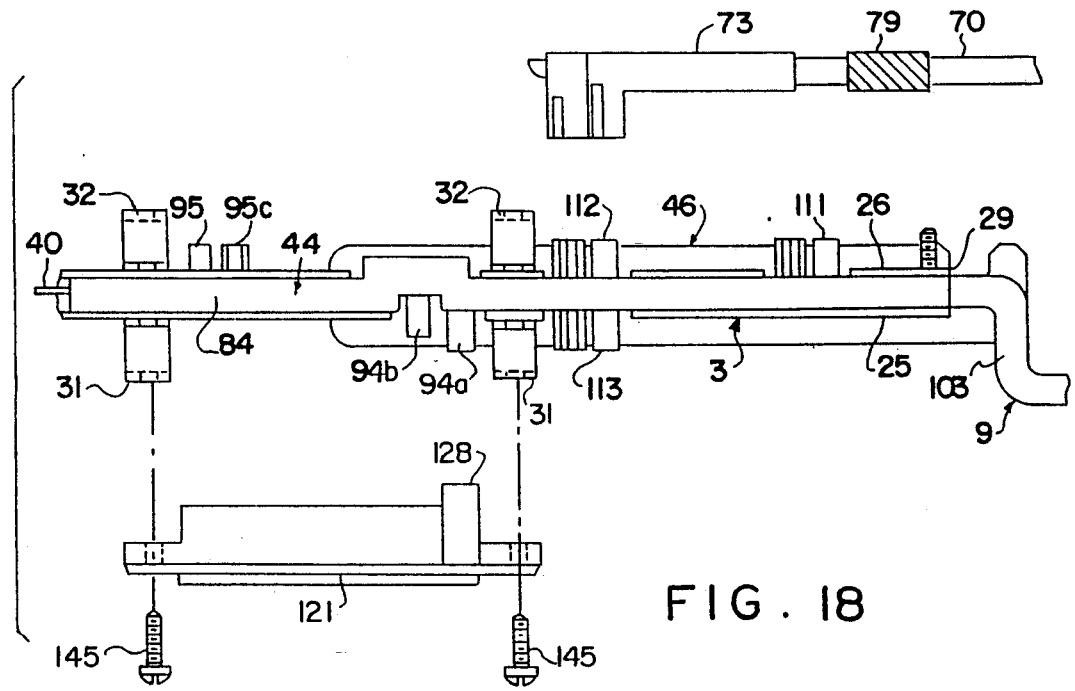
FIG. 18 is a fragmentary, top plan view of the receptacle-only terminal, wherein a power-in module and a flag connector are shown in a disassembled condition.
Figure 19:
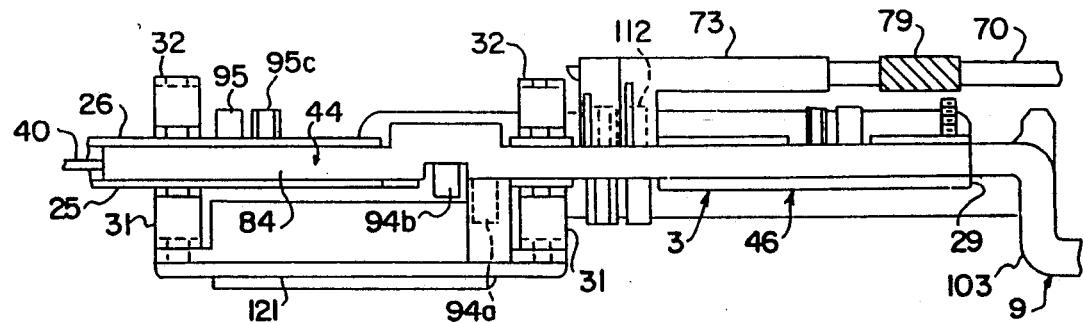
FIG. 19 is a fragmentary, top plan view of the receptacle-only terminal, shown in FIG. 18, wherein the power-in module and the flag connector are shown in an assembled condition.

Adjacent powerways 1 can be electrically interconnected in various configurations and orientations, as illustrated in FIGS. 23–28. For instance, when powerways 1 are oriented in an in-line relationship, as illustrated in FIG. 25, the yellow flag terminal 10 on flag connector 9 is attached to electrical connector 61 on the power terminal 7 of the next adjacent powerway 1 by moving or shifting flag terminal 10 horizontally, as shown in FIGS. 9 and 10. The green flag connector 73 (FIG. 25) on flag connector 70 is attached to parking posts 112 on the receptacle-only terminal 44 of the powerway disposed on the opposite side of the installed powerway 1. In this manner, all flag connectors 9 and 70 in the wiring system are securely retained within a partition panel 2.

When adjacent powerways 1 are disposed at a substantially right angle, as illustrated in FIG. 24, the yellow flag terminal 10 on flag connector 9 of the first powerway 1 is attached to electrical connector 60 on the power terminal 7 of the next adjacent powerway, so as to accommodate for the extra length required by the bend in flag connector 9. In a similar fashion, the terminal 73 on the green flag connector 70 associated with the second powerway 1 is attached to parking posts 111 of the receptacle-only terminal 44 on the first powerway 1.

Adjacent powerways 1 are interconnected in a similar fashion with respect to three-way and four-way junctions, in the manners illustrated in FIGS. 25 and 26. As a general rule for installation and assembly of powerways 1, powerways 1 can be interconnected yellow end 46 to green end 45, or green end 45 to green end 45, but never yellow end 46 to yellow end 46.

When a powerway 1 is installed in a panel 2 disposed at the end of a run or series of panels, the green flag terminal 73 is placed in a wrapped-around storage position, as illustrated in FIG. 28.

Figure 29:
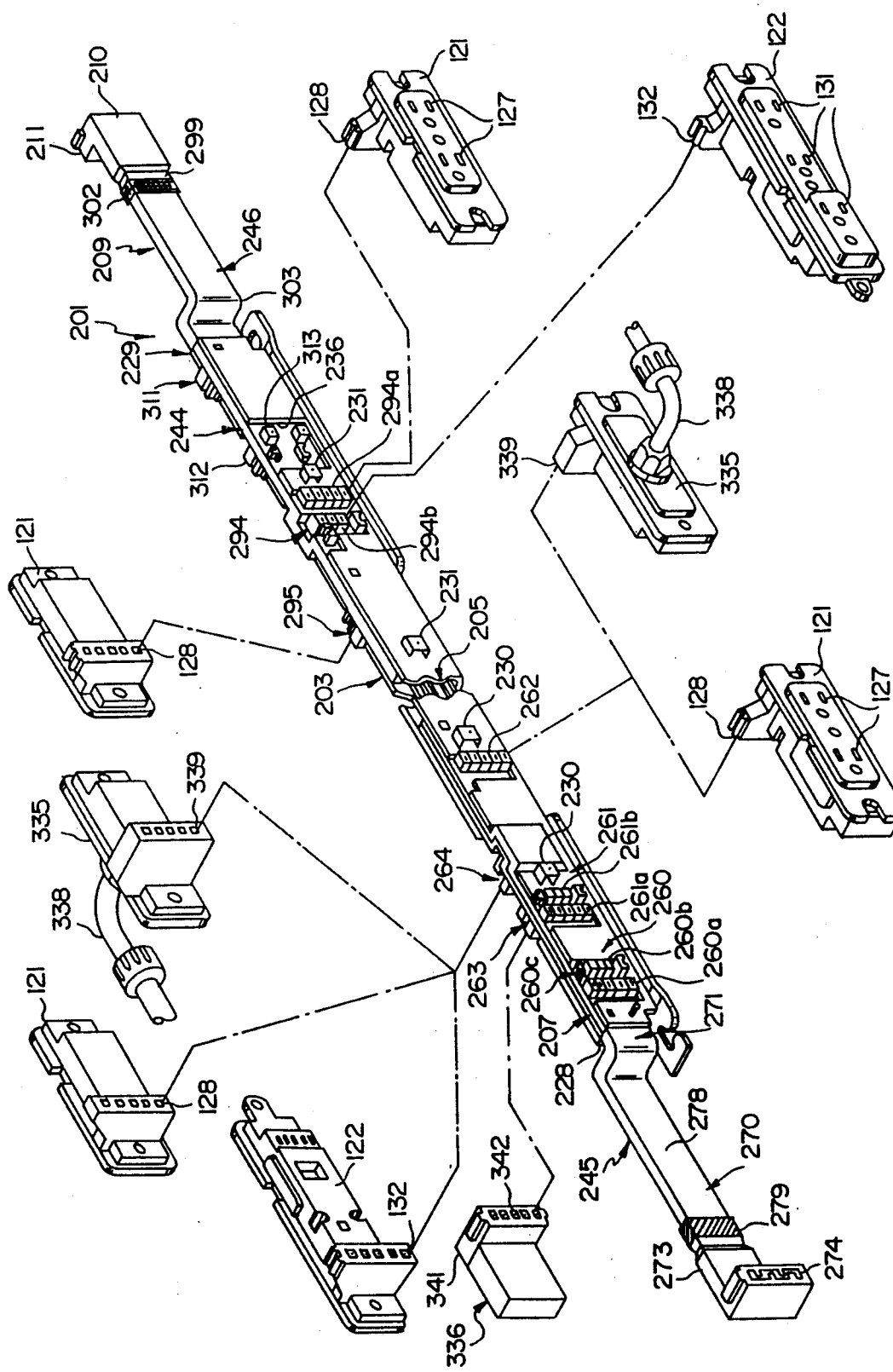
FIG. 29 is a fragmentary, perspective view of another powerway embodying the present invention, taken from one side thereof, and wherein various receptacles and electrical accessories are shown in a disassembled condition.
Figure 30:
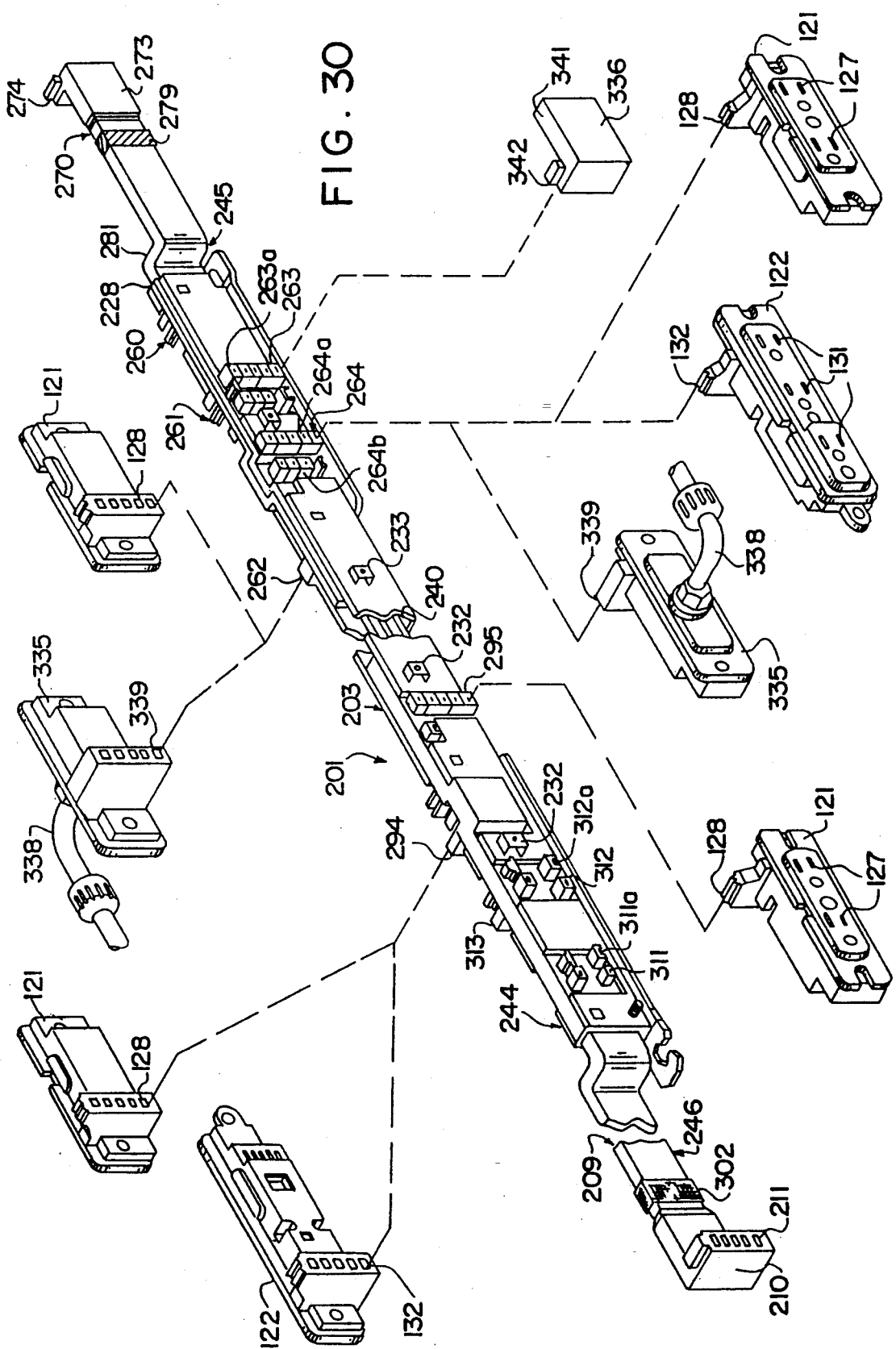
FIG. 30 is a fragmentary, perspective view of the powerway illustrated in FIG. 29, taken from the opposite side thereof and with the receptacles and electrical accessories shown in a disassembled condition.
Figure 34:
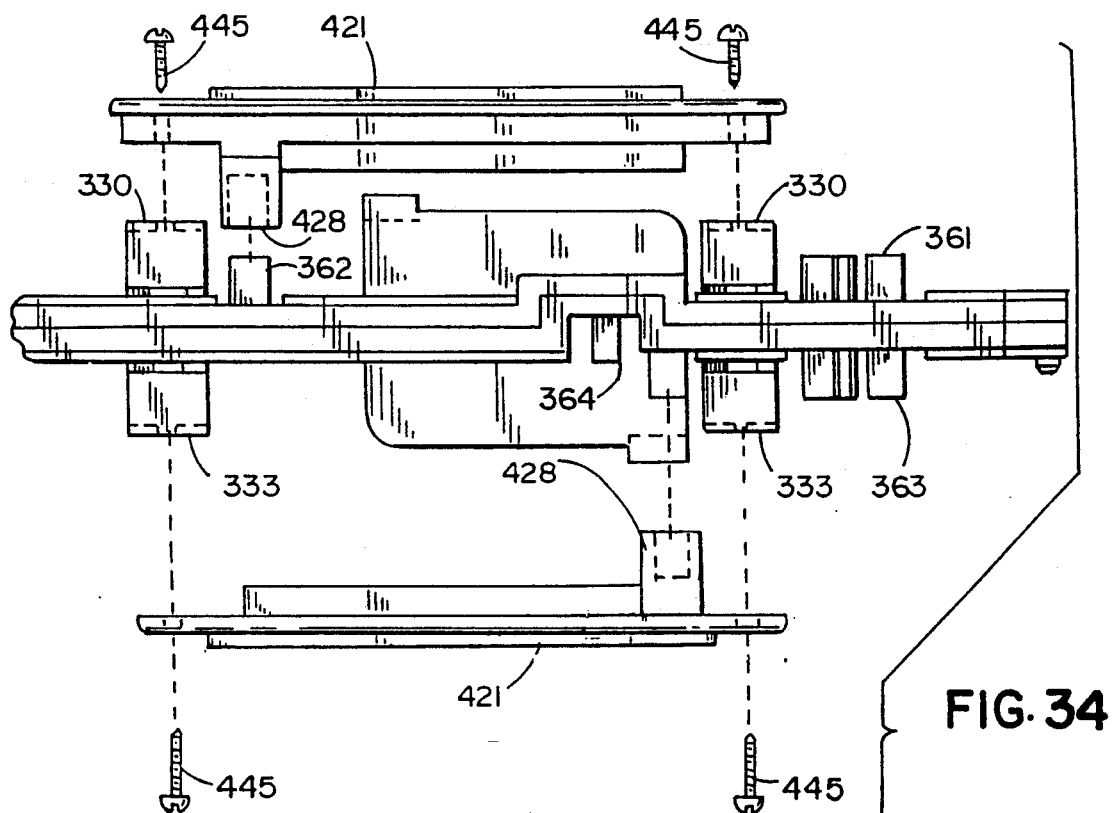
FIG. 34 is a fragmentary, top plan view of a power terminal portion of the single flag powerway, shown with two duplex receptacles in a disassembled condition.
Figure 35:
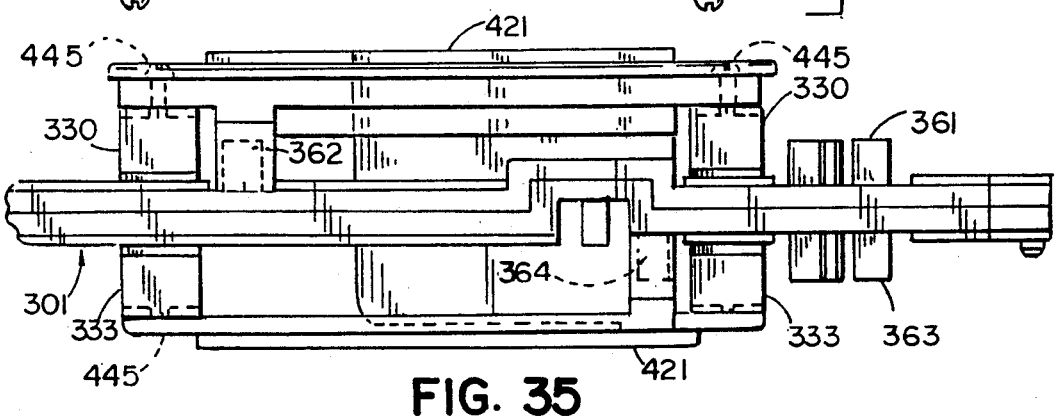
FIG. 35 is a fragmentary, top plan view of the power terminal shown in FIG. 34, wherein the duplex receptacles are shown in an assembled condition.
Figure 36:
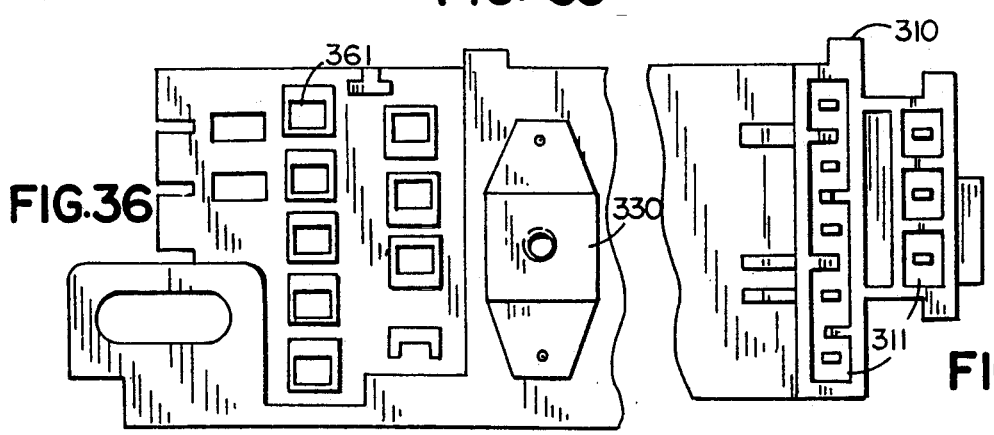
FIG. 36 is a fragmentary, side elevational view of one side of the power terminal.
Figure 37:
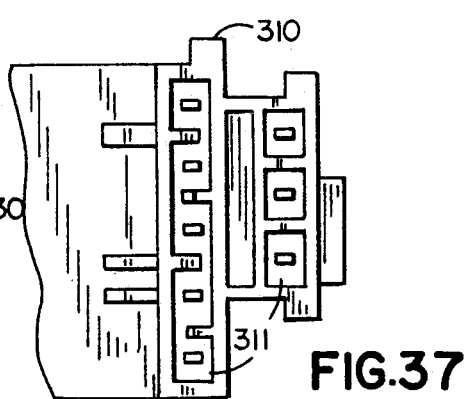
FIG. 37 is a fragmentary, side elevational view of one side of the single flag connector.
Figure 38:
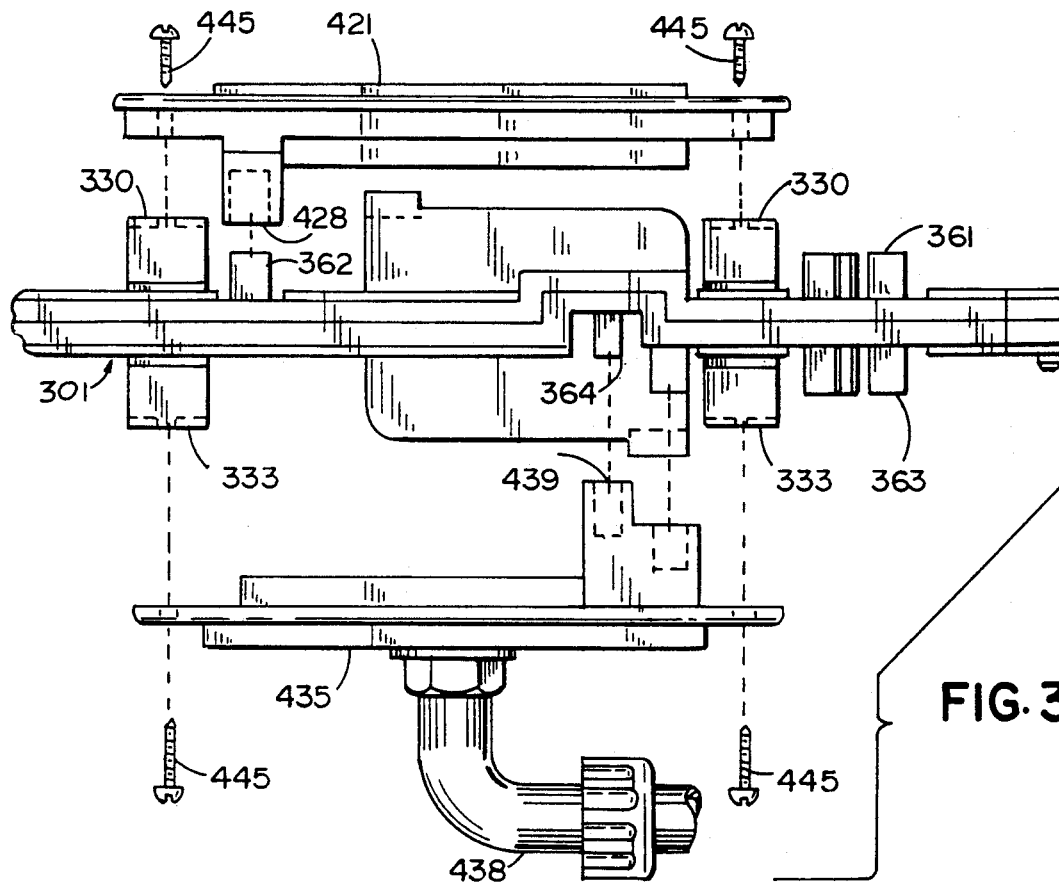
FIG. 38 is a fragmentary, top plan view of the single flag power terminal, shown with a duplex receptacle and a power-in module in a disassembled condition.

The reference numeral 201 (FIGS. 29 and 30) generally designates a five-wire embodiment of the present powerway. Since the five-wire powerway 201 is similar to the previously described eight-wire powerway 1, similar parts appearing in FIGS. 1–28 and 29–30 respectively are represented by the same corresponding reference numeral, except for the addition of 200 to the numerals of the latter. For example, the power terminal 7 and flag terminal 10 of eight-wire powerway 1 correspond to the power terminal 207 and flag terminal 210 of five-wire powerway 201.

The power terminal 207 (FIGS. 29–30) of five-wire powerway 201 is different from the power terminal 7 of eight-wire powerway 1 in that the three port columns 60b, 61b, 63b and 64b of electrical connectors 60, 61, 63 and 64 are blocked off or filled. Similarly, the receptacle-only terminal 244 of five-wire powerway 201 differs from the receptacle-only terminal 44 of eight-wire powerway 1 in that the three port column 94b of electrical connector 94 has been blocked off or filled. Furthermore, the flag terminals 273 and 300 of five-wire powerway 201 are different from the flag terminals 73 and 10 of eight-wire powerway 1 in that the three port columns 74b and 11b of electrical connectors 74 and 11 have been eliminated, such that the terminals 274 and 211 have only a single vertical set of five ports.

The illustrated five-wire powerway 201 has three hot conductors, a shared neutral conductor, and a shared ground conductor. Since the five-wire powerway 201 does not have a dedicated or isolated circuit like the eight-wire powerway 1, the dedicated simplex receptacle 120, which is used with the eight-wire powerway 1, is simply eliminated. The duplex receptacle 121 and the triplex receptacle 122 are the same for both the five-wire powerway 201 and the eight-wire powerway 1.

The base power-in module 335 (FIGS. 29–30) of five-wire powerway 201 is different from the power-in module 135 of eight-wire powerway 1 in that the socket 139 of power-in module 335 has only a single vertical set of five ports. Furthermore, the base power-in module 335 associated of the green power terminal 207, at either ports 262 or 264a.

The accessory flag connector 336 (FIGS. 29–30) of five-wire powerway 201 is different from the accessory flag connector 136 of eight-wire powerway 1 in that the socket 342 of accessory flag connector 336 has only a single vertical set of five ports.

The construction and operation of the five-wire powerway 201 is otherwise substantially similar to the previously described eight-wire powerway 1.

The shape and size of powerways 1 and 201, as well as the configuration of the various electrical connectors 60–64 and 94–95 and 260–264 and 294–295 may be varied to accommodate the particular office furniture unit into which the particular powerway is to be installed. In one embodiment of the present invention, powerways 1 and 201 are configured so as to be completely compatible and interchangeable with existing powerway designs, particularly those "Steelcase" brand wiring systems used in conjunction with the furniture units sold by Steelcase Inc. under the "Series 9000," "Valencia," "Elective Elements," "Movable Walls" and "Context"

trademarks. For example, an application of the present invention to the "Series 9000" brand panels would preferably size powerways 1 and 201 to fit with the utility raceway of existing "Series 9000" brand panels. The electrical connectors 60 and 61 on power terminal 7, and the electrical connectors 74 and 11 on flag terminals 73 and 10, would preferably fit onto the power block of a prior style "Series 9000" brand powerway, at least the concept of which is disclosed in U.S. Pat. Nos. 4,429,934; 4,376,561 and 4,203,639. The length of flag connectors 9 and 70 would also be designed to permit such interconnections with existing style powerways. As a result, powerways 1 and 201 may be used to replace selected existing powerways without modifying the adjacent existing powerways, or sacrificing design features. Furthermore, powerways 1 and 201 can be mixed in with existing powerway during panel reconfigurations and the like, thereby facilitating panel installation.

The unique power terminal and flag connector arrangement incorporated into powerways 1 and 201 of the present invention reduces the number of separate parts and separable connectors associated with the powerways to achieve improved electrical integrity, reliability, durability and safety. Both powerways 1 and 201 are designed to fit within the utility raceway of existing partition panels, and other present office furniture units. Furthermore, powerways 1 and 201 are compatible with, and may be electrically connected to prior types of powerways (not shown). Both powerways 1 and 201 are extremely versatile and permit in-line, "L," "T,", "X," and other similar powerway orientations, and are adapted to be quickly and easily installed in an associated office furniture unit.

The reference numeral 301 (FIGS. 31-43) generally designates a single flag embodiment of the present powerway. Since the single flag powerway 301 is similar to the previously described dual flag, eight wire powerway 1, similar parts appearing in FIGS. 1-28 and 31-47 respectively are represented by the same corresponding reference numeral, except for the addition of 300 to the numerals of the latter. For example, the power terminal 7 (FIG. 1) and flag terminal 10 of dual flag, eight wire powerway 1 correspond to the power terminal 307 (FIG. 31) and flag terminal 310 of the single flag powerway 301.

FIGS. 31-43 illustrate a right hand embodiment of single flag powerway 301, comprising power terminal 307 with power connectors 308, and a flag connector 309 having flag terminal 310 positioned at the free end thereof, and including power connectors 311. The power terminal 307 of powerway 301 is similar to the power terminal 7 of powerway 1 insofar as electrical connectors 362, 363 and 364 are identical to electrical connector 62, 63 and 64 respectively. The power terminal 307 of single flag powerway 301 has only 1 set of electrical connectors 361 at the extreme most end of the powerway, unlike the two sets of electrical connectors 60 and 61 on dual flag powerway 1. The housing 303 of single flag powerway 301 is trunkated or shortened substantially as compared to the housing 3 of dual flag powerway 1, but does include similar hat brackets 330-334 to mount receptacles 421, as described in greater detail hereinafter.

Figure 39:
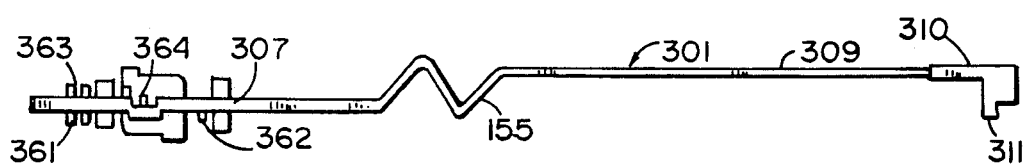
FIG. 39 is a partially schematic, top plan view of the single flag powerway, shown in an unextended, normal position.
Figure 40:
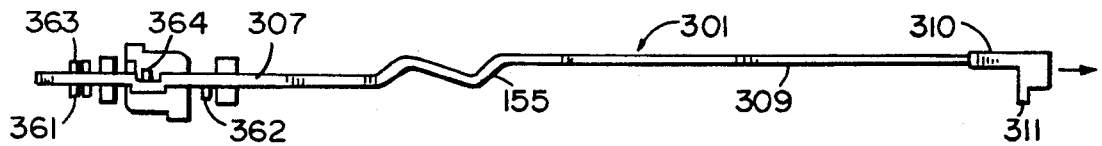
FIG. 40 is a partially schematic, top plan view of the single flag power connector, shown in an extended position.

The flag terminal 310 associated with single flag powerway 301 is identical to the flag terminal 10 associated with dual flag powerway 1, and is adapted to mate with the electrical connectors 361 and 363 on power terminal 307. In right hand, single flag powerway 301, the power connectors 311 in flag terminal 310 face in the same direction as the connectors 361 and 362 on power terminal 307. Flag terminal 310 is connected to the free end of flag connector 309, which is substantially longer than the flag connector 9 associated with dual flag powerway 1. Flag connector 309 has a flexible festooned construction, and includes a preformed, Z-shaped section 155 positioned adjacent the interior end of powerway housing 303. The Z-shaped section 155 of flag connector 309 permits the flag connector to be extended and retracted in a longitudinal direction, as best illustrated in FIGS. 39 and 40. With reference to FIG. 33, flag connector 309 has a length, which in its unextended or normal condition, positions flag terminal 310 outside the end of panel 302 a preselected distance to permit direct connection with the electrical connectors 361 or 363 on an adjacent power terminal 307.

With reference to FIGS. 31-35, powerway 301 is adapted for use in conjunction with a number of different electrical accessories, at least some of which are physically mounted thereon by fasteners at hat brackets 330-334. Three different types of power taps or receptacles may be attached to powerway 301, which include the illustrated duplex receptacle 421, as well as a similar simplex receptacle (not shown), and a triplex receptacle (not shown). Duplex receptacle 421 includes two conventional plug sockets 427 on the forward side thereof, and is designed to electrically access one of the powerway circuits. Duplex receptacle 421 also includes a set of power sockets or ports 428 on the rear side thereof, which are adapted to mate only with ports 362 or 364 of power terminal 307.

In addition to receptacles, powerway 301 is also adapted to be used in conjunction with a base power-in module 435 (FIG. 38), and an accessory flag connector 436 (FIG. 31) the latter of which may be used for lighting harnesses, power pools, top power in or the like (not shown).

Base power-in module 435 (FIG. 38) has a conduit 438 attached fixedly to the exterior side thereof for connection with building power, such as a tombstone or the like. Base power-in module 435 is designed to access all of the circuits and conductors of powerway 301 to supply electrical power thereto. A set of eight sockets 439 are located on the rearside of base power in module 435, and mate only with ports 364 of power terminal 307.

Accessory flag connector 436 (FIG. 31) includes an L-shaped terminal 441 with a set of quick disconnect power connectors 442 electrically connected with accessory conduits (not shown). Accessory flag terminal 441 has a substantially L-shaped plan configuration, and connectors 442 are in the form of a socket keyed to mate only with connectors 363 of power terminal 307. The shape of ports 342 precludes attachment of accessory flag terminal 441 with any of the other connectors on powerway 301.

Each of the receptacles 421 and power accessories 441 and 435 is securely retained on powerway 301 at their selected location. In this example, each receptacle 421 is fastened to one of the pairs of hat brackets 330-334 by a pair of threaded screws 445.

Figure 44:
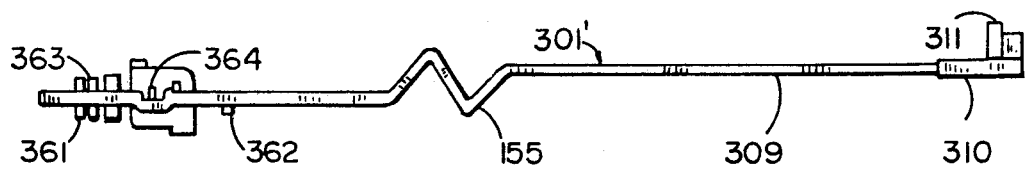
FIG. 44 is a partially schematic, top plan view of a left hand embodiment of the single flag powerway.
Figure 46:
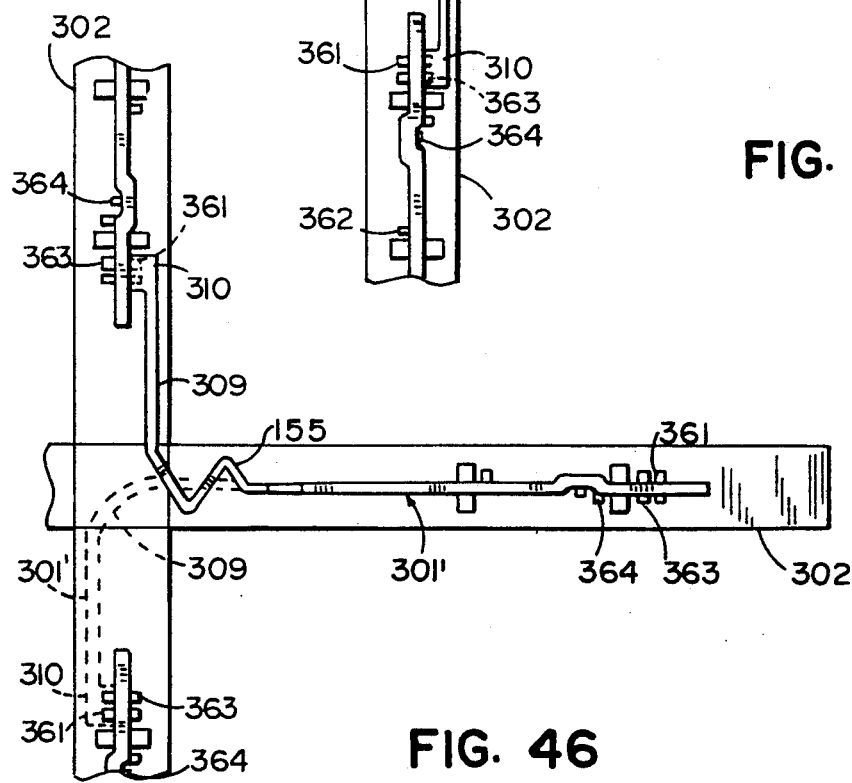
FIG. 46 is a fragmentary, partially schematic top plan view of three left hand, single flag powerways, shown interconnected in a T-configuration.
Figure 47:
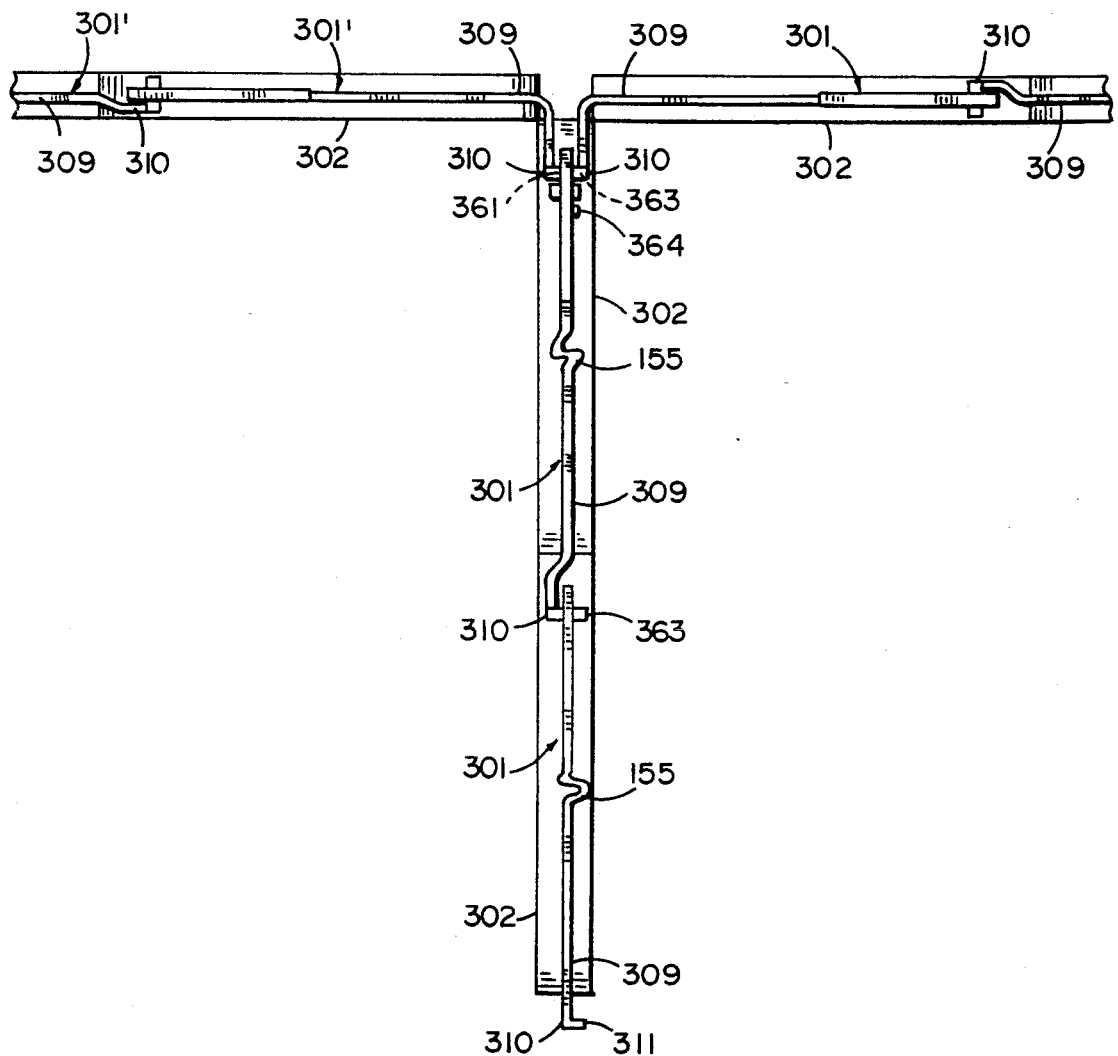
FIG. 47 is a fragmentary, partially schematic top plan view of multiple single flag powerways, shown interconnected in a T-configuration.

A left hand, single flag powerway 301 [1] is illustrated in FIG. 44, and is identical to the above-identified right hand single flag powerway 301, except that the power connectors 311 on flag terminal 310 face in the opposite direction. More specifically, in left hand, single flag powerway 301 ¹ (FIG. 44), the ports 311 on flag terminal 310 face in the same direction as the electrical connectors 363 and 364 on power terminal 307. Since the left hand and right hand single flag powerways 301 and 301 ¹ are otherwise identical, the same corresponding reference numerals are used for similar parts for ease of description herein. As will be described in greater detail hereinafter, the single flag powerways are 301 and 301 ¹ provided in left hand and right hand versions to facilitate branching, as illustrated in FIGS. 45-47.

Figure 41:
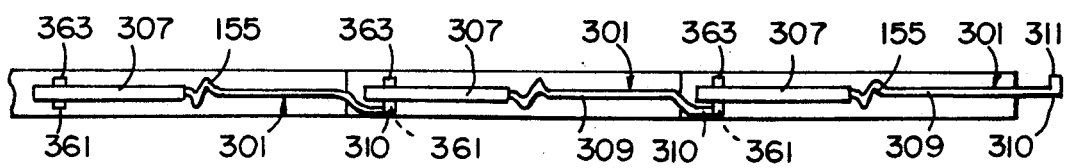
FIG. 41 is a partially schematic, top plan view of three single flag powerways interconnected in adjacent panels.

In operation, adjacent powerways 301 and 301 ¹ can be electrically interconnected in various configurations and orientations, as illustrated in FIGS. 41-47. For instance, when powerways 301 are oriented in an in-line relationship, as illustrated in FIG. 41, the flag terminal 310 on flag connector 309 is attached to electrical connector 361 on the power terminal 307 of the next adjacent powerway 301.

Figure 42:
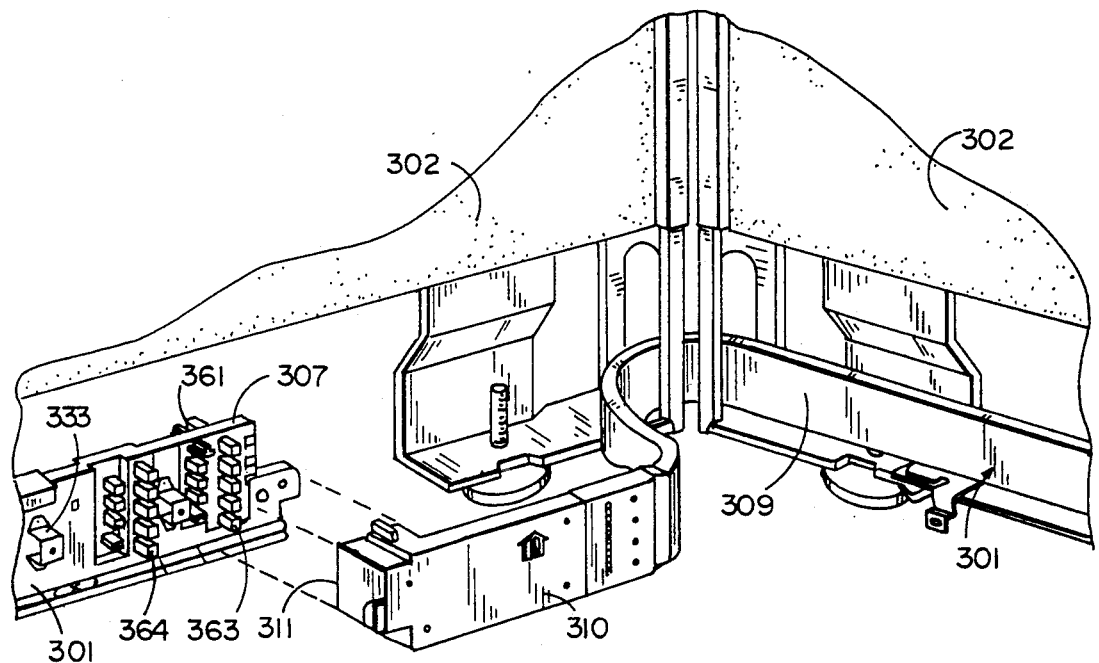
FIG. 42 is a fragmentary, perspective view of two adjacent single flag powerways, shown in a disassembled condition.
Figure 43:
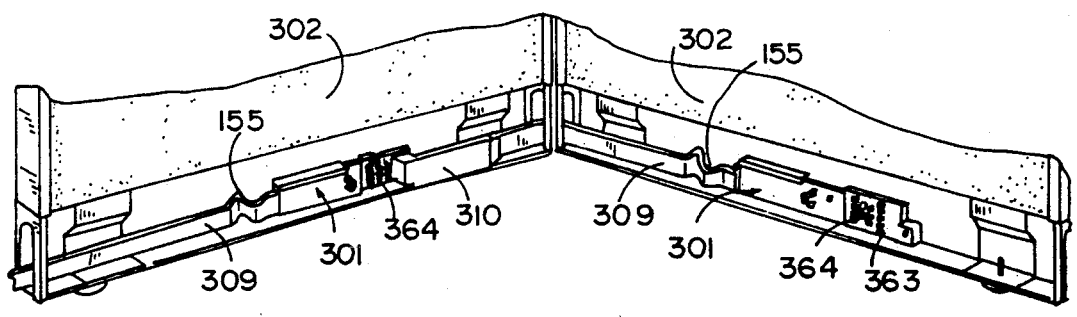
FIG. 43 is a fragmentary, perspective view of two single flag powerways, shown in an assembled condition.

When adjacent powerways 301 are disposed at a substantially right angle, as shown in FIGS. 42 and 43, the flag terminal 310 on flag connector 309 is extended by pulling the flag connector longitudinally, so as to accommodate for the extra length required by the bend. In the example shown in FIGS. 42 and 43, the ports 311 of flag terminal 310 ar connected with the connectors 363 on power terminal 307.

Figure 45:
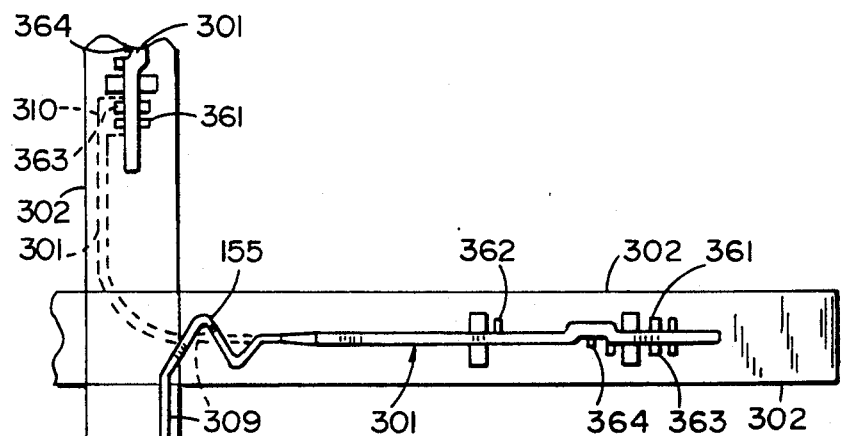
FIG. 45 is a fragmentary, partially schematic top plan view of three right hand, single flag powerways, shown in a T-configuration.

As best illustrated in FIG. 45, when right hand powerways 301 are arranged in a T-configuration, two of the three powerways 301 can be electrically interconnected in either of the following manners. As oriented in FIG. 45, the powerway 301 on the right is connected with the upper powerway 301 by interconnecting flag terminal 310 with electrical connectors 363. The powerway 301 on the right may be connected with the lower powerway 301 by interconnecting flag terminal 310 with electrical connectors 363.

As best illustrated in FIG. 46, a left hand powerway 301 1 may be similarly interconnected in a T-configuration in the following manner. As oriented in FIG. 46, the powerway 301 ¹ on the right is connected with the upper powerway 301 by connecting flag terminal 310 with electrical connectors 361. The power terminal 301 ¹ on the right is connected with the lower powerway 301 by interconnecting flag terminal 310 with electrical connectors 361.

FIG. 47 illustrates a plurality of powerways 301 and 301 1 interconnected in a T-shaped configuration, wherein in the orientation illustrated in FIG. 47, the lower power terminal 301 has electrical connectors 361 and 363 connected with a left hand powerway 301 ¹ and a right hand powerway 301, respectively.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. In a freestanding office furniture system of the type having a plurality of individual furniture units interconnected side-by-side in a predetermined orientation, and wherein each of said furniture units includes a utility raceway therethrough accessible at opposite sides of said furniture unit, the improvement of a modular powerway comprising:

an elongated housing received within the utility raceway of an associated one of said furniture units, and including first and second ends thereof positioned adjacent opposite ends of said utility raceway;

means mounted in said housing for conducting electrical power between opposite ends of said powerway;

a power terminal mounted in said housing adjacent said first end thereof, and including a set of quick-disconnect power connectors oriented toward one side of said powerway, and electrically connected with said electrical conducting means;

a power tap electrically connected with said electrical conducting means, and adapted to tap electrical power from said powerway; and a flexible flag connector having one end thereof fixedly mounted in said housing adjacent said second end thereof, and including a flag terminal mounted on the opposite end of said flag connector, and movable relative to said housing; said flag terminal including a set of quick-disconnect power connectors oriented toward the other side of said powerway, electrically connected with said electrical conducting means, and adapted to mate with the quick-disconnect power connectors on said power terminal, whereby adjacent powerways are electrically interconnected horizontally and thereby connecting the quick-disconnect connectors on the flag terminal of one powerway with the quick-disconnect connectors on the power terminal of an adjacent powerway.

2. An office furniture system as set forth in claim 1, wherein;

said powerway includes a second flexible flag connector having one end thereof fixedly mounted in said housing adjacent said first end thereof, and including a second flag terminal mounted on the opposite end of said second flag connector, and movable relative to said housing; said second flag terminal including a set of quick-disconnect power connectors oriented toward the one side of said powerway, electrically connected with said electrical conducting means, and adapted to mate with the quick-disconnect power connectors on said power terminal branching.

3. An office furniture system as set forth in claim 2, wherein:

said powerway includes a parking member positioned adjacent the first end of said housing, and adapted to detachably mount thereon for storage one of said flag terminals.

4. An office furniture system as set forth in claim 3, wherein:

said first and second-named flag connectors on said powerway are coded with different indicia to facilitate properly orienting adjacent powerways for electrical interconnection.

5. An office furniture system as set forth in claim 4, wherein:

said powerway includes a receptacle-only terminal mounted in said housing adjacent said second end thereof, and having a set of quick-disconnect receptacle connectors electrically connected with said electrical conducting means.

6. An office furniture system as set forth in claim 5, wherein:

said power tap on said powerway includes a set of quick-disconnect receptacle connectors which mate with the quick-disconnect receptacle connectors on said receptacle-only terminal to separably electrically interconnect the same.

7. An office furniture system as set forth in claim 6, wherein:
said powerway power terminal includes a set of quick-disconnect receptacle connectors electrically connected with said electrical conducting means, and shaped to mate with the quick-disconnect receptacle connectors on said power tap to separably electrically interconnect the same.

8. An office furniture system as set forth in claim 7, wherein:
said powerway power terminal includes a set of quick-disconnect power-in connectors electrically connected with said electrical conducting means, which in conjunction with said quick-disconnect receptacle connectors define a power-in connector; and including
a power-in module including a set of quick-disconnect connectors which mate with the power-in connector on said power terminal to supply electrical power to said passageway.

9. An office furniture system as set forth in claim 8, wherein:
said quick-disconnect power-in connectors on said powerway are offset inwardly from the quick-disconnect receptacles connectors on said power terminal to accept either said power tap or said power-in module without increasing the overall thickness of said panel.

10. An office furniture system as set forth in claim 9, wherein:
said powerway receptacle-only terminal includes a keyed lock-out which prevents connecting said power-in module therewith.

11. An office furniture system as set forth in claim 1, wherein:
said powerway includes a parking member positioned adjacent the second end of said housing, and adapted to detachably mount thereon for storage one of said flag terminals.

12. An office furniture system as set forth in claim 1, wherein:
said power terminal and said flag connector on said powerway are coded with different indicia to facilitate properly orienting adjacent powerways for electrical interconnection.

13. An office furniture system as set forth in claim 1, wherein:
said powerway includes a receptacle-only terminal mounted in said housing adjacent said second end thereof, and having a set of quick-disconnect receptacle connectors electrically connected with said electrical conducting means.

14. An office furniture system as set forth in claim 13, wherein:
said power tap on said powerway includes a set of quick-disconnect receptacle connectors which mate with the quick-disconnect receptacle connectors on said receptacle-only terminal to separably electrically interconnect the same.

15. An office furniture system as set forth in claim 1, wherein:
said flag connector includes means for longitudinally extending and retracting the same to facilitate interconnecting adjacent powerways disposed in either in-line or angular relationships.

16. An office furniture system as set forth in claim 15, wherein:
said longitudinally extending means comprises a Z-shaped portion of said flag connector.

17. A modular powerway for office furniture units and the like of the type having a utility raceway therethrough accessible adjacent opposite sides of the office furniture unit, the improvement of a modular powerway, comprising:
an elongated housing shaped for reception within the utility raceway of the office furniture unit, and including first and second ends thereof configured for positioning adjacent opposite ends of said utility raceway;
means mounted in said housing for conducting electrical power between opposite ends of said powerway;
a power terminal mounted in said housing adjacent said first end thereof, and including a set of quick-disconnect power connectors oriented toward one side of said powerway, and electrically connected with said electrical conducting means;
a power tap electrically connected with said electrical conducting means, and adapted to tap electrical power from said powerway; and
a flexible flag connector having one end thereof fixedly mounted in said housing adjacent said second end thereof, and including a flag terminal mounted on the opposite end of said flag connector, and movable relative to said housing; said flag terminal including a set of quick-disconnect power connectors oriented toward the other side of said powerway, electrically connected with said electrical conducting means, and adapted to mate with the quick-disconnect power connectors on said power terminal, whereby adjacent powerways are electrically interconnected horizontally and thereby connecting the quick-disconnect connectors on the flag terminal of one powerway with the quick-disconnect connectors on the power terminal of an adjacent powerway.

18. In an office furniture unit of the type having a utility raceway therethrough accessible at opposite sides thereof, the improvement of a modular powerway comprising:
an elongated housing received within the utility raceway of said office furniture unit, and including first and second ends positioned in adjacent opposite ends of said utility raceway;
means mounted in said housing for conducting electrical power between opposite ends of said powerway;
a power terminal mounted in said housing adjacent said first end thereof, and including a set of quick-disconnect power connectors oriented toward one side of said powerway, and electrically connected with said electrical conducting means;
a power tap electrically connected with said electrical conducting means, and adapted to tap electrical power from said powerway; and
a flexible flag connector having one end thereof fixedly mounted in said housing adjacent said second end thereof, and including a flag terminal mounted on the opposite end of said flag connector, and movable relative to said housing; said flag terminal including a set of quick-disconnect power connectors oriented toward the other side of said powerway, electrically connected with said electrical conducting means, and adapted to mate with the quick-disconnect power connectors on said power terminal, whereby adjacent powerways are electrically interconnected horizontally and thereby connecting the quick-disconnect connectors on the flag terminal of one powerway with the quick-disconnect connectors on the power terminal of an adjacent powerway.

* * * * *

UNITED STATES PATENT AND TRADEMARK OFFICE
CERTIFICATE OF CORRECTION

PATENT NO. : 5,158,472

DATED : 10/27/92

INVENTOR(S) : Gary S. Juhlin et al

It is certified that error appears in the above-identified patent and that said Letters Patent is hereby corrected as shown below:

Title page, block "[75] Inventor:" should be
--Gary S. Juhlin, Alto, Michigan
Randall P. Nelsen, Alto, Michigan
Marvin C. Knauf, Conklin, Michigan
Mark T. Slager, Kentwood, Michigan--.

Column 2, line 30;
After "condition" insert --,--.

Column 5, line 24;
"a" should be --an--.

Column 7, line 59;
"6" should be --67--.

* Column 11, line 20;
after "is" delete "to".

Column 12, line 47;
"of" should be --with--.

* Column 13, line 32;
delete "," after "T,".

Column 15, line 26;
"ar" should be --are--.

Column 15, line 39;
"301 1" should be "301$^1$".

UNITED STATES PATENT AND TRADEMARK OFFICE
CERTIFICATE OF CORRECTION

PATENT NO. : 5,158,472
DATED : 10/27/92
INVENTOR(S) : Gary S. Juhlin et al

It is certified that error appears in the above-identified patent and that said Letters Patent is hereby corrected as shown below:

```
Column 15, line 48;
    "301 1" should be "301¹".
Column 17, line 23;
    "passageway" should be --powerway--.
```

Signed and Sealed this

Twenty-third Day of November, 1993

Attest:

BRUCE LEHMAN

Attesting Officer     Commissioner of Patents and Trademarks